(12) United States Patent
Coleman et al.

(10) Patent No.: US 9,097,874 B2
(45) Date of Patent: Aug. 4, 2015

(54) POLARITY CONFIGURATIONS FOR PARALLEL OPTICS DATA TRANSMISSION, AND RELATED APPARATUSES, COMPONENTS, SYSTEMS, AND METHODS

(71) Applicant: CORNING OPTICAL COMMUNICTIONS LLC, Hickory, NC (US)

(72) Inventors: John Douglas Coleman, Hickory, NC (US); Wesley Allan Yates, Lenoir, NC (US)

(73) Assignee: Corning Optical Communications LLC, Hickory, NC (US)

( * ) Notice: Subject to any disclaimer, the term of this patent is extended or adjusted under 35 U.S.C. 154(b) by 0 days.

(21) Appl. No.: 14/448,252

(22) Filed: Jul. 31, 2014

(65) Prior Publication Data
US 2014/0341509 A1 Nov. 20, 2014

Related U.S. Application Data

(63) Continuation-in-part of application No. 13/557,671, filed on Jul. 25, 2012.

(51) Int. Cl.
*G02B 6/44* (2006.01)
(52) U.S. Cl.
CPC ................... *G02B 6/4472* (2013.01)
(58) Field of Classification Search
None
See application file for complete search history.

(56) References Cited

U.S. PATENT DOCUMENTS

| | | |
|---|---|---|
| 4,611,887 A | 9/1986 | Glover et al. |
| 4,699,460 A | 10/1987 | Szentesi |
| 5,204,925 A | 4/1993 | Bonanni et al. |
| 5,613,070 A | 3/1997 | Born |
| 6,185,358 B1 | 2/2001 | Park |
| 6,219,479 B1 | 4/2001 | Madden et al. |
| 6,224,269 B1 | 5/2001 | Engstrand et al. |
| 6,275,643 B1 | 8/2001 | Bandy et al. |

(Continued)

FOREIGN PATENT DOCUMENTS

| | | | |
|---|---|---|---|
| CN | 102073109 A | 5/2011 | ............... G02B 6/42 |
| EP | 1065544 A2 | 1/2001 | ............... G02B 6/44 |

(Continued)

OTHER PUBLICATIONS

Patent Cooperation Treaty, International Search Report for PCT/US2013/051424, Oct. 21, 2013, 4 pages.

(Continued)

*Primary Examiner* — Mike Stahl

(57) ABSTRACT

Fiber optic connection assemblies for rearranging sets of fiber optic signals arranged in one parallel optical configuration into one or more different parallel optical configurations are disclosed. In one arrangement, two (2) data transmission pairs are connected between one multi-fiber connector from each of two connector sets in a first parallel optical configuration using a common set of fiber positions for each multi-fiber connector. Another two (2) data transmission pairs are connected to the common set of fiber positions of a multi-fiber connector from the first connector set, but are connected to other fiber positions of the multi-fiber connectors of the second connector set, using fiber positions that are not used by the other two (2) data transmission pairs. In this manner, cabling complexity can be reduced with increased signal density within fiber optic cables having a multi-fiber configuration.

18 Claims, 14 Drawing Sheets

(56) References Cited

U.S. PATENT DOCUMENTS

| | | | |
|---|---|---|---|
| 6,351,582 B1 | 2/2002 | Dyke et al. | |
| 6,364,539 B1 | 4/2002 | Shahid | |
| 6,402,393 B1 | 6/2002 | Grimes et al. | |
| 6,464,404 B1 | 10/2002 | Robinson et al. | |
| 6,496,641 B1 | 12/2002 | Mahony | |
| 6,501,900 B1 | 12/2002 | Aloisio, Jr. et al. | |
| 6,554,483 B1 | 4/2003 | Sun et al. | |
| 6,621,975 B2 | 9/2003 | Laporte et al. | |
| 6,694,083 B2 | 2/2004 | Paradiso et al. | |
| 6,758,600 B2 | 7/2004 | Del Grosso et al. | |
| 6,869,227 B2 | 3/2005 | Del Grosso et al. | |
| 7,088,981 B2 | 8/2006 | Chang | |
| 7,147,383 B2 | 12/2006 | Sullivan | |
| 7,237,966 B2 | 7/2007 | Quinby et al. | |
| 7,354,202 B1 | 4/2008 | Luger | |
| 7,391,952 B1 | 6/2008 | Ugolini et al. | |
| 7,542,653 B2 | 6/2009 | Johnson et al. | |
| 7,603,044 B1 | 10/2009 | Conroy et al. | |
| 7,646,981 B2 | 1/2010 | Coffey | |
| 7,689,079 B2 * | 3/2010 | Burnham et al. | 385/51 |
| 7,756,371 B1 | 7/2010 | Burnham et al. | 385/51 |
| 8,009,959 B2 | 8/2011 | Barnes et al. | |
| 8,251,591 B2 | 8/2012 | Barnes et al. | |
| 8,821,036 B2 | 9/2014 | Shigehara | |
| 2002/0015563 A1 | 2/2002 | Murakami et al. | |
| 2002/0181925 A1 | 12/2002 | Hodge et al. | |
| 2003/0044141 A1 | 3/2003 | Melton et al. | |
| 2003/0072537 A1 | 4/2003 | Eichenberger et al. | |
| 2003/0210861 A1 | 11/2003 | Weiss et al. | |
| 2004/0062498 A1 | 4/2004 | Del Grosso et al. | |
| 2004/0179771 A1 | 9/2004 | Verhagen et al. | |
| 2004/0184741 A1 | 9/2004 | Del Grosso et al. | |
| 2005/0036749 A1 | 2/2005 | Vogel et al. | |
| 2005/0152640 A1 | 7/2005 | Lemoff | |
| 2005/0163448 A1 | 7/2005 | Blackwell, Jr. et al. | |
| 2005/0207709 A1 | 9/2005 | Del Grosso et al. | |
| 2006/0029334 A1 | 2/2006 | Quinby et al. | 385/59 |
| 2006/0034573 A1 | 2/2006 | Guan et al. | |
| 2006/0045521 A1 | 3/2006 | Emery et al. | |
| 2006/0133736 A1 | 6/2006 | Sullivan | |
| 2006/0269208 A1 | 11/2006 | Allen et al. | |
| 2006/0280420 A1 | 12/2006 | Blackwell, Jr. et al. | |
| 2007/0071392 A1 | 3/2007 | Baucom et al. | |
| 2007/0189694 A1 | 8/2007 | Mullaney et al. | |
| 2008/0152292 A1 | 6/2008 | Wilken et al. | |
| 2008/0175548 A1 | 7/2008 | Knecht et al. | |
| 2008/0193091 A1 | 8/2008 | Herbst | |
| 2008/0205824 A1 | 8/2008 | Cody et al. | |
| 2008/0279506 A1 | 11/2008 | Kerry et al. | |
| 2009/0103879 A1 | 4/2009 | Tang et al. | |
| 2009/0154888 A1 | 6/2009 | Abbott, III et al. | |
| 2009/0169163 A1 | 7/2009 | Abbott, III et al. | |
| 2009/0180737 A1 | 7/2009 | Burnham et al. | 385/59 |
| 2009/0263089 A1 | 10/2009 | Keller et al. | 385/109 |
| 2009/0290844 A1 | 11/2009 | Mullaney et al. | |
| 2010/0092129 A1 | 4/2010 | Conner | |
| 2010/0092133 A1 | 4/2010 | Conner | |
| 2010/0092146 A1 | 4/2010 | Conner et al. | |
| 2010/0092169 A1 | 4/2010 | Conner et al. | |
| 2010/0092171 A1 | 4/2010 | Conner | |
| 2010/0098386 A1 | 4/2010 | Kleeberger | |
| 2010/0195955 A1 | 8/2010 | Burnham et al. | |
| 2010/0303408 A1 | 12/2010 | Conner et al. | |
| 2010/0322554 A1 | 12/2010 | Barnes et al. | 385/24 |
| 2011/0103803 A1 * | 5/2011 | Kolesar | 398/142 |
| 2011/0129226 A1 | 6/2011 | Vleugels et al. | |
| 2011/0274400 A1 | 11/2011 | Mudd et al. | 385/134 |
| 2011/0293277 A1 | 12/2011 | Bradea et al. | |
| 2012/0189259 A1 * | 7/2012 | Manes | 385/135 |
| 2012/0288233 A1 | 11/2012 | Barnes et al. | |
| 2013/0163932 A1 | 6/2013 | Cooke et al. | |
| 2014/0029909 A1 * | 1/2014 | Rhoney et al. | 385/137 |
| 2014/0140660 A1 * | 5/2014 | Buff et al. | 385/59 |
| 2014/0254986 A1 | 9/2014 | Kmit et al. | |

FOREIGN PATENT DOCUMENTS

| | | |
|---|---|---|
| WO | 0244782 A2 | 6/2002 |
| WO | 03016975 A2 | 2/2003 |
| WO | 2005114286 A1 | 12/2005 |
| WO | 2010044979 A1 | 4/2010 |
| WO | 2010093794 A1 | 8/2010 |
| WO | 2011053409 A1 | 5/2011 |

OTHER PUBLICATIONS

Author Unknown, "Fiber Systems: Best Practices for Ensuring Polarity of Array-Based Fiber Optic Channels," White Paper, Panduit Corp., 2008, 10 pages.

Stewart, "Optical Assembly Plant: Base 8 Ribbon Module Jumper Classic", Flyer 0000009429-EN, Corning Cable Systems, Jan. 23, 2008, 1 page.

Author Unknown, "Data Center Fabric: Corning Cable Systems Optical Cabling Solutions for Brocade," Technical Brief, GA-TB-052-01, Brocade Communications Systems, Inc., Sep. 2008, 26 pages.

Author Unknown, "U-Space System for Brocade 48000," Product Specifications, LAN-904-EN, Corning Cable Systems LLC, Apr. 2008, 16 pages.

Author Unknown, "U-Space System for Brocade SAN Directors," Specification Sheet, LAN-904-EN, Corning Cable Systems LLC, Oct. 2010, 8 pages.

Author Unknown, "Base 8 Modules," Standard Recommended Procedure 003-121, Issue 1, Corning Cable Systems LLC, Apr. 2008, 3 pages.

Author Unknown, "QSFP (Quad Small Formfactor Pluggable) Transceiver," INF-8438i Specification, SFF Committee, Rev 1.0, Nov. 2006, 75 pages.

Non-final Office Action for U.S. Appl. No. 13/649,392 mailed Oct. 2, 2014, 13 pages.

Final Office Action for U.S. Appl. No. 12/472,849 mailed Dec. 31, 2014, 14 pages.

Non-final Office Action for U.S. Appl. No. 12/288,231 mailed May 25, 2011, 10 pages.

Final Office Action for U.S. Appl. No. 12/288,231 mailed Nov. 14, 2011, 6 pages.

Advisory Action for U.S. Appl. No. 12/288,231 mailed Apr. 5, 2012, 3 pages.

Non-final Office Action for U.S. Appl. No. 12/288,231 mailed Feb. 13, 2014, 7 pages.

Non-final Office Action for U.S. Appl. No. 12/323,356 mailed Sep. 30, 2011, 15 pages.

Final Office Action for U.S. Appl. No. 12/323,356 mailed Mar. 2, 2012, 18 pages.

Notice of Allowance for U.S. Appl. No. 12/323,356 mailed Jan. 17, 2014, 7 pages.

Non-final Office Action for U.S. Appl. No. 12/323,385 mailed Sep. 21, 2011, 10 pages.

Final Office Action for U.S. Appl. No. 12/323,385 mailed Mar. 6, 2012, 12 pages.

Advisory Action for U.S. Appl. No. 12/323,385 mailed Jun. 15, 2012, 2 pages.

Non-final Office Action for U.S. Appl. No. 10/805,892 mailed Aug. 10, 2004, 4 pages.

Notice of Allowance for U.S. Appl. No. 10/805,892 mailed Dec. 21, 2004, 5 pages.

Non-final Office Action for U.S. Appl. No. 11/020,730 mailed Feb. 28, 2006, 6 pages.

Notice of Allowance for U.S. Appl. No. 11/020,730 mailed Sep. 20, 2006, 7 pages.

Non-final Office Action for U.S. Appl. No. 12/472,849 mailed Oct. 12, 2011, 9 pages.

Non-final Office Action for U.S. Appl. No. 12/472,849 mailed Aug. 20, 2012, 9 pages.

Final Office Action for U.S. Appl. No. 12/472,849 mailed May 13, 2013, 15 pages.

Advisory Action and Examiner-Initiated Interview Summary for U.S. Appl. No. 12/472,849 mailed Aug. 5, 2013, 5 pages.

(56) References Cited

OTHER PUBLICATIONS

Non-final Office Action for U.S. Appl. No. 12/472,849 mailed Oct. 9, 2013, 14 pages.
Non-final Office Action for U.S. Appl. No. 12/472,849 mailed May 23, 2014, 13 pages.
Non-final Office Action for U.S. Appl. No. 12/486,427 mailed Mar. 5, 2010, 5 pages.
Notice of Allowance for U.S. Appl. No. 12/486,427 mailed Aug. 27, 2010, 6 pages.
Notice of Allowance for U.S. Appl. No. 12/486,427 mailed Jun. 13, 2011, 7 pages.
Non-final Office Action for U.S. Appl. No. 12/486,427 mailed Oct. 21, 2010, 5 pages.
Notice of Allowance for U.S. Appl. No. 12/486,473 mailed May 29, 2012, 9 pages.
Non-final Office Action for U.S. Appl. No. 12/486,473 mailed Sep. 29, 2011, 4 pages.
Non-final Office Action for U.S. Appl. No. 12/323,344 mailed Aug. 18, 2011, 8 pages.
Notice of Allowance for U.S. Appl. No. 12/323,344 mailed Jan. 9, 2012, 9 pages.
Non-final Office Action for U.S. Appl. No. 12/323,395 mailed Dec. 8, 2011, 7 pages.
Non-final Office Action for U.S. Appl. No. 12/323,395 mailed Apr. 17, 2014, 15 pages.
Final Office Action for U.S. Appl. No. 12/323,395, mailed Oct. 9, 2014, 10 pages.
Quayle Action for U.S. Appl. No. 13/557,671 mailed Dec. 6, 2013, 4 pages.
Notice of Allowance for U.S. Appl. No. 13/557,671 mailed Jun. 25, 2014, 6 pages.
Applicant-Initiated Interview Summary for U.S. Appl. No. 13/557,671, mailed Oct. 9, 2014, 3 pages.
Non-final Office Action for U.S. Appl. No. 13/559,070 mailed Sep. 27, 2012, 7 pages.
Non-final Office Action for U.S. Appl. No. 13/751,232 mailed Sep. 17, 2014, 8 pages.
Non-final Office Action for U.S. Appl. No. 13/559,070 mailed Apr. 3, 2014, 8 pages.
Final Office Action for U.S. Appl. No. 13/559,070 mailed Oct. 1, 2013, 8 pages.
International Search Report for PCT/US2009/056880 mailed Nov. 9, 2009, 3 pages.
International Search Report for PCT/US2009/057128 mailed Nov. 9, 2009, 2 pages.
International Search Report for PCT/US2009/057140 mailed Nov. 9, 2009, 3 pages.
International Search Report for PCT/US2009/057244 mailed Nov. 9, 2009, 4 pages.
International Preliminary Report on Patentability for PCT/US2009/057244 mailed Apr. 19, 2011, 7 pages.
International Search Report for PCT/US2010/035939 mailed Aug. 16, 2010, 2 pages.
International Search Report for PCT/US2013/069548 mailed Feb. 6, 2014, 4 pages.
Tanji et al., "Optical Fiber Cabling Technologies for Flexible Access Network," Optical Fiber Technology, Academic Press, London, US, vol. 14, No. 3, Jul. 1, 2008, 8 pages.
Author Unknown, "High Density PARA-OPTIX Cable Assemblies and Enclosures," Tyco Electronics, 2007, 2 pages.
Kolesar et al., "Clause 86 MDI Optical Pin Layout and Connector," IEEE P802.3ba, Jan. 2009, 24 pages.
Author Unknown, "TIA Standard: Optical Fiber Cabling Components Standard," TIA-568-C.3, Telecommunications Industry Association, Jun. 2008, 38 pages.
Author Unknown, "Parallel Optics," Applications Engineering Note 123, Rev 0, Corning Cable Systems LLC, Mar. 23, 2008, 4 pages.
Notice of Allowance for U.S. Appl. No. 12/323,395 mailed Jan. 7, 2015, 6 pages.
Notice of Allowance for U.S. Appl. No. 13/557,671 mailed Feb. 17, 2015, 7 pages.
Final Office Action for U.S. Appl. No. 13/559,070 mailed Jan. 13, 2015, 8 pages.
Final Office Action for U.S. Appl. No. 13/751,232 mailed Jan. 23, 2015, 11 pages.
International Preliminary Report on Patentability for PCT/US2013/051424 mailed Feb. 5, 2015, 9 pages.

\* cited by examiner

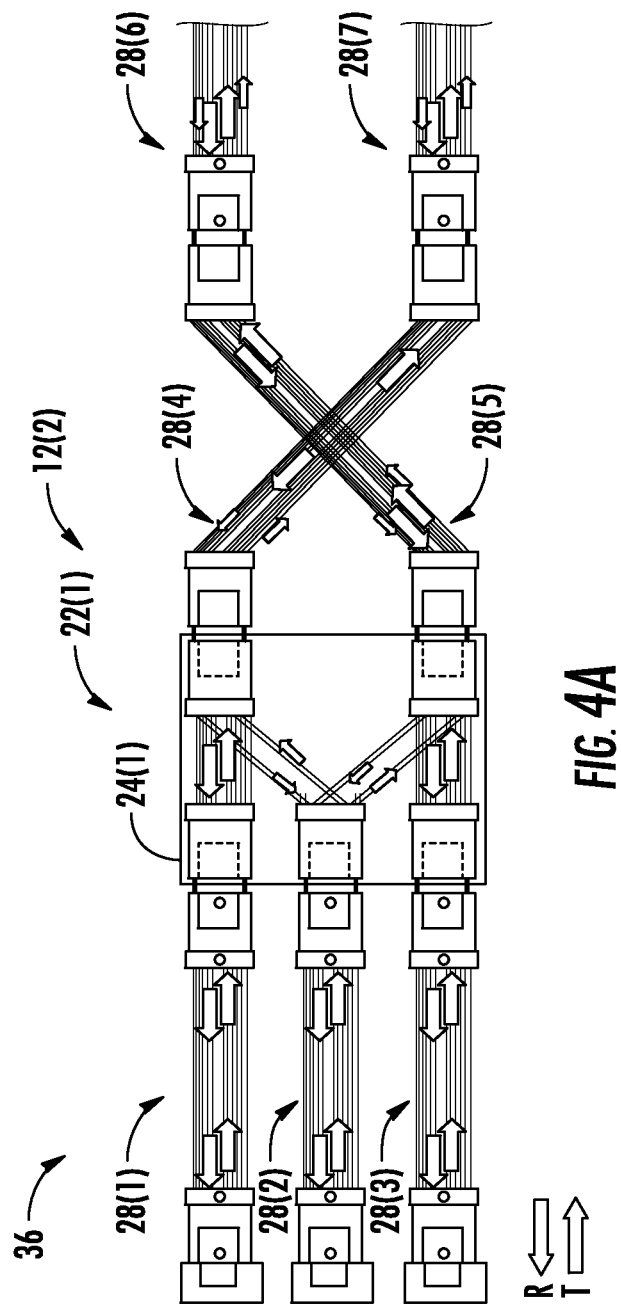

POLARITY CONFIGURATIONS FOR PARALLEL OPTICS DATA TRANSMISSION, AND RELATED APPARATUSES, COMPONENTS, SYSTEMS, AND METHODS

CROSS-REFERENCE TO RELATED APPLICATIONS

This application is a continuation-in-part of U.S. patent application Ser. No. 13/557,671 filed on Jul. 25, 2012, the content of which is relied upon and incorporated herein by reference in its entirety, and the benefit of priority under 35 U.S.C. §120 is hereby claimed.

BACKGROUND

The disclosure relates generally to fiber optics data transmission and more particularly to polarity configurations for parallel optics data transmission which may be used in high density network applications.

Benefits of utilizing optical fiber include extremely wide bandwidth and low noise operation. Because of these advantages, optical fiber is increasingly being used for a variety of applications, including but not limited to broadband voice, video, and data transmission. Fiber optic networks employing optical fiber are being developed for use in delivering voice, video, and data transmissions to subscribers over both private and public networks. These fiber optic networks often include separated connection points linking optical fibers to provide fiber optic connections from one connection point to another. In this regard, fiber optic equipment is located in data distribution centers or central offices to support live fiber interconnections. For example, the fiber optic equipment can support interconnections between servers, storage area networks (SANs), and/or other equipment at data centers. Interconnections may be further supported by fiber optic patch panels or modules.

Fiber optic assemblies, including fiber optic harness cables and fiber optic modules, may be used to arrange optical fibers according to various schemes or mappings to facilitate data transmission via parallel optics. Because a single signal may be broken down and parsed into separate optical fibers for communication in parallel with one another, accuracy in the routing of the optical fibers and transmission of the signal components allows for faster communications. Current polarity schemes in harness assemblies may be prone to errors in routing due to complicated interweaving of optical fibers and uncoordinated sizing of individual fibers in groups of optical fibers that are intended to operate together to carry the parsed signal. A need exists for an improved scheme for connecting optical fibers for parallel-optics data transmission to overcome such problems in the art.

Fiber optic equipment can be customized based on application and connection bandwidth needs. The fiber optic equipment is typically included in housings that are mounted in equipment racks to optimize use of space. Connection density becomes an issue in many of these arrangements, especially in situations where a polarity configuration uses multi-fiber connectors that have more fiber positions than are utilized by the polarity configuration of the connected fiber optic equipment.

No admission is made that any reference cited herein constitutes prior art. Applicant expressly reserves the right to challenge the accuracy and pertinency of any cited documents.

SUMMARY

Embodiments of the disclosure relate to fiber optic connection assemblies for rearranging sets of fiber optic signals arranged in one parallel optical configuration into one or more different parallel optical configurations. This may reduce cabling complexity and increase signal density within fiber optic cables having a multi-fiber configuration. In one non-limiting exemplary embodiment, eight (8) groups of optical fibers are arranged in four (4) data transmission pairs between a first connector set of three (3) multi-fiber connectors and a second connector set of two (2) multi-fiber connectors. Two (2) of the data transmission pairs are connected between one multi-fiber connector from each connector set in a first parallel optical configuration using a common set of fiber positions for each multi-fiber connector. The other two (2) data transmission pairs are connected to the common set of fiber positions of the second multi-fiber connector, but are connected to other fiber positions of the two (2) multi-fiber connectors of the second connector set, using fiber positions that are not used by the other two (2) data transmission pairs, thereby defining a second parallel optical configuration that utilizes a larger number of fiber positions of a multi-fiber connector than the first parallel optical configuration. In this manner, three (3) multi-fiber connections, each having a first parallel optical configuration, can be converted into two (2) multi-fiber connections having higher signal density while maintaining a standardized parallel optical configuration for simplified cabling and system planning.

One embodiment of the disclosure relates to a fiber optic connection assembly. The fiber optic connection assembly comprises first, second, third, fourth, fifth, sixth, seventh, and eighth groups of optical fibers. The groups of optical fibers are arranged in data transmission pairs of the groups whereby one group of each pair is configured to provide data in a transmit direction and the other group of the pair is configured to provide data in a receive direction. The pairs of the groups are organized such that a first pair comprises the first and second groups of optical fibers, a second pair comprises the third and fourth groups of optical fibers, a third pair comprises the fifth and sixth groups of optical fibers, and a fourth pair comprises the seventh and eighth groups of optical fibers. The fiber optic connection assembly further comprises a first connector set comprising first, second, and third connectors, and a second connector set comprising fourth and fifth connectors. The first pair of groups of optical fibers extends between the first and fourth connectors. The second pair of groups of optical fibers extends between the second and fourth connectors. The third pair of groups of optical fibers extends between the second and fifth connectors. The fourth pair of groups of optical fibers extends between the third and fifth connectors.

An additional embodiment of the disclosure relates to a fiber optic connection assembly. The fiber optic connection assembly comprises first, second, third, fourth, fifth, sixth, seventh, and eighth groups of optical fibers. The groups of optical fibers are arranged in data transmission pairs of the groups whereby one group of each pair is configured to provide data in a transmit direction and the other group of the pair is configured to provide data in a receive direction. The pairs of the groups are organized such that a first pair comprises the first and second groups of optical fibers, a second pair comprises the third and fourth groups of optical fibers, a third pair comprises the fifth and sixth groups of optical fibers, and a fourth pair comprises the seventh and eighth groups of optical fibers. The fiber optic connection assembly further comprises a first connector set comprising first, second, and third connectors, and a second connector set comprising a fourth connector having first and second pluralities of fiber positions. The first pair of groups of optical fibers extends between the first connector and the first plurality of fiber positions of the fourth connector. The second pair of groups of optical fibers extends between the second connector and the first plurality of fiber positions of the fourth connector. The third pair of groups of optical fibers extends between the second connector and the second plurality of fiber positions of the fourth connector. The fourth pair of groups of optical fibers extends between the third connector and the second plurality of fiber positions of the fourth connector.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding, and are incorporated in and constitute a part of this specification. The drawings illustrate one or more embodiment(s), and together with the description serve to explain principles and operation of the various embodiments.

BRIEF DESCRIPTION OF THE DRAWINGS

FIGS. 4A and 4B are a schematic representation of another fiber optic network utilizing two fiber optic connection assemblies according to FIG. 3 and multiple fiber optic extension cables disposed therebetween, demonstrating the advantages of increased signal density provided by the fiber optic connection assemblies;

DETAILED DESCRIPTION

Embodiments of the disclosure relate to fiber optic connection assemblies for rearranging sets of fiber optic signals arranged in one parallel optical configuration into one or more different parallel optical configurations. This may reduce cabling complexity and increase signal density within fiber optic cables having a multi-fiber configuration. In one non-limiting exemplary embodiment, eight (8) groups of optical fibers are arranged in four (4) data transmission pairs between a first connector sets of three (3) multi-fiber connectors and a second connector set of two (2) multi-fiber connectors. Two (2) of the data transmission pairs are connected between one multi-fiber connector from each connector set in a first parallel optical configuration using a common set of fiber positions for each multi-fiber connector. The other two (2) data transmission pairs are connected to the common set of fiber positions of the second multi-fiber connector, but are connected to other fiber positions of the two (2) multi-fiber connectors of the second connector set, using fiber positions that are not used by the other two (2) data transmission pairs, thereby defining a second parallel optical configuration that utilizes a larger number of fiber positions of a multi-fiber connector than the first parallel optical configuration. In this manner, three (3) multi-fiber connections, each having a first parallel optical configuration, can be converted into two (2) multi-fiber connections having higher signal density while maintaining a standardized parallel optical configuration for simplified cabling and system planning.

Various embodiments will be further clarified by the following examples.

Figure 1:
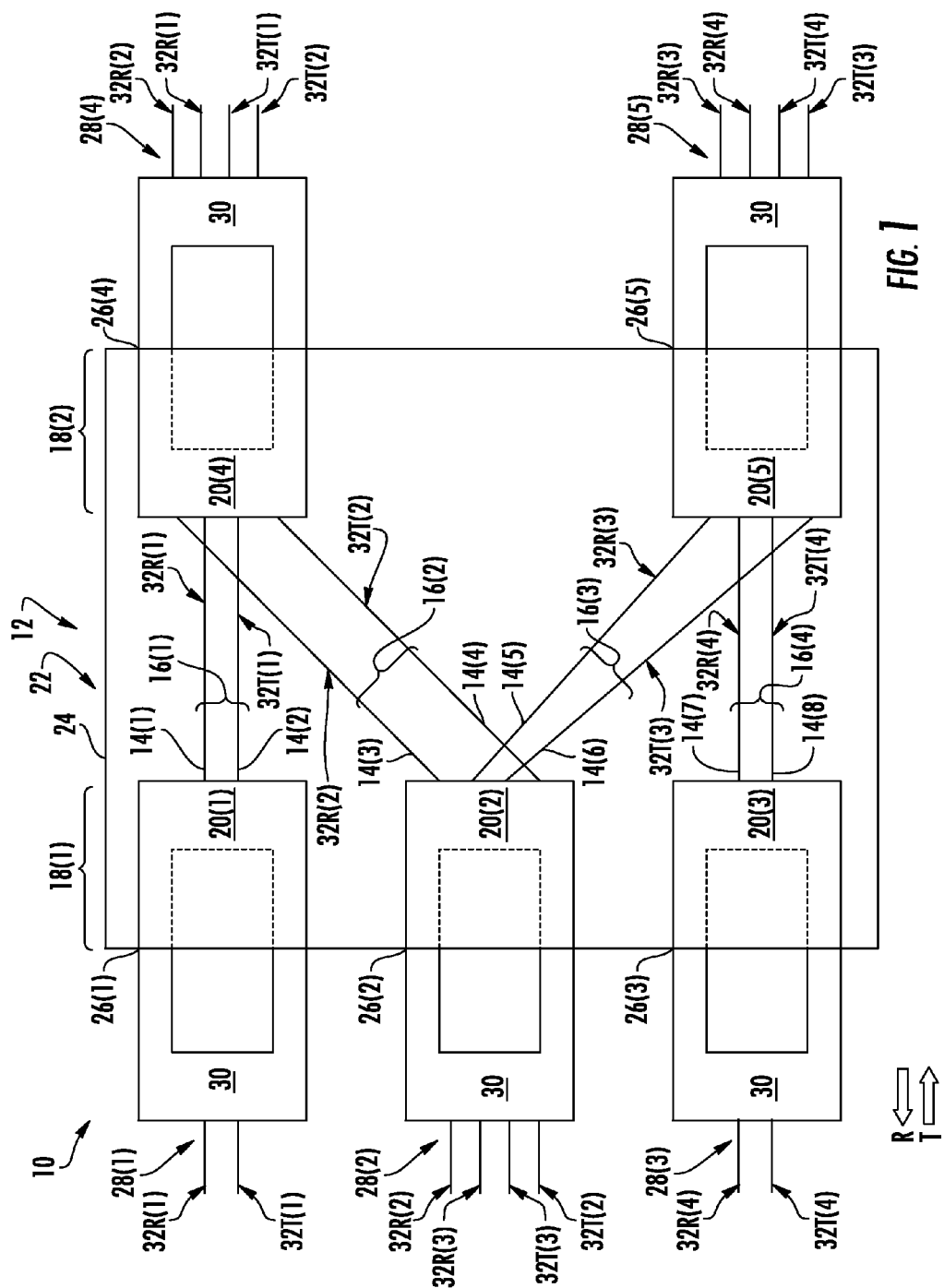
FIG. 1 is a schematic representation of a fiber optic network utilizing a fiber optic connection assembly for increasing signal density in the network according to one embodiment.

In this regard, FIG. 1 illustrates a fiber optic network 10 according to an exemplary embodiment. The fiber optic network 10 includes a connection assembly 12 configured to convert fiber optic signals between different polarity configurations, in order to increase the signal density and to simplify cabling within the fiber optic network 10. In this regard, fiber optic connection assembly 12 includes eight (8) optical fiber groups 14(1) through 14(8) arranged in four (4) data transmission pairs 16(1) through 16(4). One group 14 of each pair 16 is configured to provide data in a transmit direction and the other group 14 in the pair 16 is configured to provide data in a receive direction. In this embodiment, the pairs 16 are organized such that pair 16(1) comprises groups 14(1) and 14(2), pair 16(2) comprises groups 14(3) and 14(4), pair 16(3) comprises groups 14(5) and 14(6), and pair 16(4) comprises groups 14(7) and 14(8). The connection assembly 12 also includes a first connector set 18(1) including multi-fiber connectors 20(1) through 20(3), and a second connector set 18(2) comprising multi-fiber connectors 20(4) and 20(5). In this embodiment, data transmission pair 16(1) is connected between multi-fiber connectors 20(1) and 20(4), data transmission pair 16(2) is connected between multi-fiber connectors 20(2) and 20(4), data transmission pair 16(3) is connected between multi-fiber connectors 20(2) and 20(5), and data transmission pair 16(4) is connected between multi-fiber connectors 20(3) and 20(5).

As will be discussed in detail below, multi-fiber connectors 20(1) through 20(3) are arranged in a BASE-8 polarity configuration, in which eight (8) of the twelve (12) fiber positions of each multi-fiber connector 20(1) through 20(3) are utilized to enable a 40 gigabit (40G) connection to fiber optic equipment. It should be understood that alternative configurations may employ any number of n fiber positions as part of a polarity configuration.

The eight (8) fibers of multi-fiber connectors 20(1) and 20(3) are passed directly to corresponding fiber positions of multi-fiber connectors 20(4) and 20(5). However, multi-fiber connector 20(2) passes half of the corresponding BASE-8 fibers to the remaining fiber positions of multi-fiber connector 20(4), and passes the other half of the BASE-8 configuration to the remaining fibers of multi-fiber connector 20(5). Thus, all twelve (12) fiber positions of multi-fiber connector 20(4) and 20(5) are utilized.

In this embodiment, the fiber optic connection assembly 12 is a fiber optic module 22. The fiber optic module includes a housing 24 that encloses the sub-assembly of the groups of optical fibers 14(1) through 14(8), and multi-fiber connectors 20(1) through 20(5).

In this embodiment, each multi-fiber connector 20(1) is connected to a corresponding fiber optic adapter 26(1) through 26(5) disposed in the housing 24 of fiber optic module 22. Thus, in this embodiment, the fiber optic connection assembly 12 may be a self-contained unit.

In this embodiment, the fiber optic network 10 includes a plurality of fiber optic cables 28(1) through 28(5). Each fiber optic cable 28 is plugged into a corresponding fiber optic adapter 26 of the fiber optic module 22 via a multi-fiber connector 30. It should be understood that the fiber optic cables 28(1) through 28(5) may be of a variety of types, including jumper cables, trunk cables, or other cables, or a combination thereof As discussed above, each of multi-fiber connectors 20(1) through 20(3) have a BASE-8 configuration, in which eight (8) of the twelve (12) fiber positions of the fiber optic connectors are utilized. Likewise, in the fiber optic network 10, fiber optic cables 28(1) through 28(3) also have a BASE-8 configuration. Meanwhile, just as multi-fiber connectors 20(4) and 20(5) utilize all twelve (12) fiber positions, so do fiber optic cables 28(4) and 28(5) utilize all twelve (12) fibers in the cable. In this manner, cable volume and complexity may be reduced when connecting multiple BASE-8 fiber optic equipment, or other fiber optic equipment that does not utilize all the fibers in a multi-fiber cable, to a fiber optic network.

Turning now to the movement of fiber optic signals through the fiber optic network 10, each data transmission pair 16 includes a group of optical fibers 14 that carries a group of optical signals 32 in a receive direction 32R, and a group of optical fibers 14 that carries a group of optical signals 32 in a transmit direction 32T. For example, data transmission pair 16(1) includes optical fiber groups 14(1) and 14(2). In this example, optical fiber group 14(1) carries optical signals 32R(1) in a received direction from multi-fiber connector 20(4) to multi-fiber connector 20(1), and optical fiber group 14(2) carries optical signals 32T(1) in a transmit direction from multi-fiber connector 20(1) to multi-fiber connector 20(4). Thus, in this embodiment, BASE-8 optical signals 32R(1) and 32T(1) carried on fiber optic cable 28(1) remain grouped together as they travel through the fiber optic module 22 in the transmit and receive direction. Data transmission pair 16(4) operates in a similar manner, with optical fiber group 14(7) carrying optical signals 32R(4) in a receive direction and optical fiber group 14(8) carrying optical signals 32T(4) in a transmit direction.

It can be seen, however, that the BASE-8 configuration of fiber optic cable 28(2) cannot be passed through multi-fiber connector 20 of the fiber optic module 22 to a single multi-fiber connector of the second connector set 18(2). Instead, the optical signals 32 of the BASE-8 configuration are divided into component data transmission pairs 16(2) and 16(3), each having four (4) (i.e., n/2) fibers. As a result, for data transmission pair 16(2), optical fiber group 14(3) passes optical signals 32R(2) in a receive direction from multi-fiber connector 20(4) to multi-fiber connector 20(2), and optical fiber group 14(4) passes optical signals 32T(2) from multi-fiber optic connector 20(2) to multi-fiber connector 20(4). Because the fiber positions of multi-fiber connector 20(4) corresponding to a BASE-8 port configuration are already being utilized by data transmission pair 16(1), data transmission pair 16(2) instead utilizes the remaining fiber positions of multi-fiber connector 20(4) that would otherwise be unused. Likewise, data transmission pair 16(3) is connected between multi-fiber connector 20(2) and 20(5), and passes optical signals 32R(3) and 32T(3) therebetween in a similar manner. Thus, it can be seen that fiber optic cable 28(4) carries both optical signals 32R(1) and 32T(1) corresponding to the BASE-8 configuration of fiber optic cable 28(1), and also optical signals 32R(2) and 32T(2), corresponding to half of the BASE-8 configuration of fiber optic cable 28(2). Likewise, fiber optic cable 28(5) carries optical signals 32R(4) and 32T(4), corresponding to the BASE-8 configuration of fiber optic cable 28(3), and also carries the optical signals 32R(3) and 32T(3), corresponding to the other half of the BASE-8 configuration of multi-fiber connector 20(2). In this manner, the twelve (12) fiber optic cables 28(4) and 28(5) may be more efficiently utilized within the fiber optic network 10.

Figure 2:
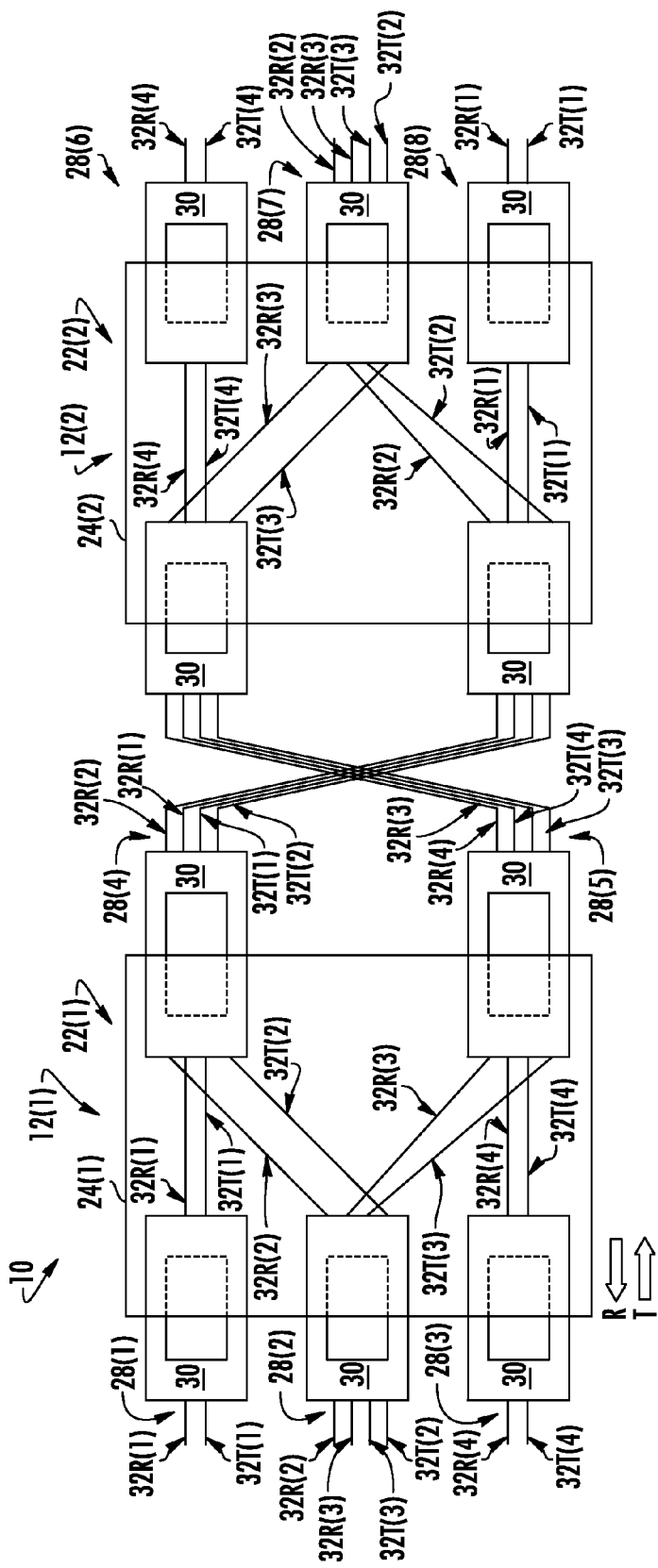
FIG. 2 is a schematic representation of the fiber optic network of FIG. 1, illustrating connections between a pair of fiber optic connection assemblies in the network.

One advantage of fiber optic network 10 is that multiple BASE-8 configurations may be shuffled and combined into a smaller number of twelve (12) fiber configurations in a way that enables the component signals to be reshuffled and separated into the same BASE-8 configurations at another point in the fiber optic network 10. In this regard, FIG. 2 illustrates an expended portion of fiber optic network 10 having a pair of fiber optic connection assemblies 12(1) and 12(2). As discussed above with respect to FIG. 1, the BASE-8 configurations of fiber optic cables 28(1), 28(2), and 28(3) are combined and shuffled into two (2) twelve (12) port configurations by fiber optic module 22(1), corresponding to fiber optic cables 28(4) and 28(5). As shown by FIG. 2, fiber optic cables 28(4) and 28(5) are connected to a complementary fiber optic module 22(2) which reshuffles and separates individual BASE-8 configuration of fiber optic cables 28(1) through 28(3) and connects them to corresponding BASE-8 configurations of fiber optic cables 28(6) through 28(8). For example, the BASE-8 configuration of fiber optic cable 28(1) is the same BASE-8 configuration of fiber optic cable 28(8), with optical signals 32T(1) passing from fiber optic cable 28(1) through fiber optic module 22(1) to fiber optic cable 28(4), and through fiber optic module 22(2) to fiber optic cable 28(8). Similarly, optical signals 32R(1) are passed in the opposite direction by a parallel route. Likewise, the BASE-8 configuration of fiber optic cable 28(3) is directly connected to the same BASE-8 configuration of fiber optic cable 28(6). The BASE-8 configuration of fiber optic cable 28(2), however, is split between fiber optic cables 28(4) and 28(5), as discussed above in detail with respect to FIG. 1. However, fiber optic module 22(2) reshuffles and combines the signals back into the same BASE-8 configuration of fiber optic cable 28(2) at corresponding fiber optic cable 28(7). In particular, it can be seen that optical signals 32R(2), 32R(3), 32T(3), and 32T(2) have the same BASE-8 configuration on both fiber optic cables 28(2) and 28(7).

As fiber optic networks increase in size, the benefits of this increased network density increase as well. For example, by utilizing all twelve (12) fibers of a twelve (12) fiber optic cable within a network infrastructure, total cabling volume within the network can be reduced by as much as one-third.

Figure 3:
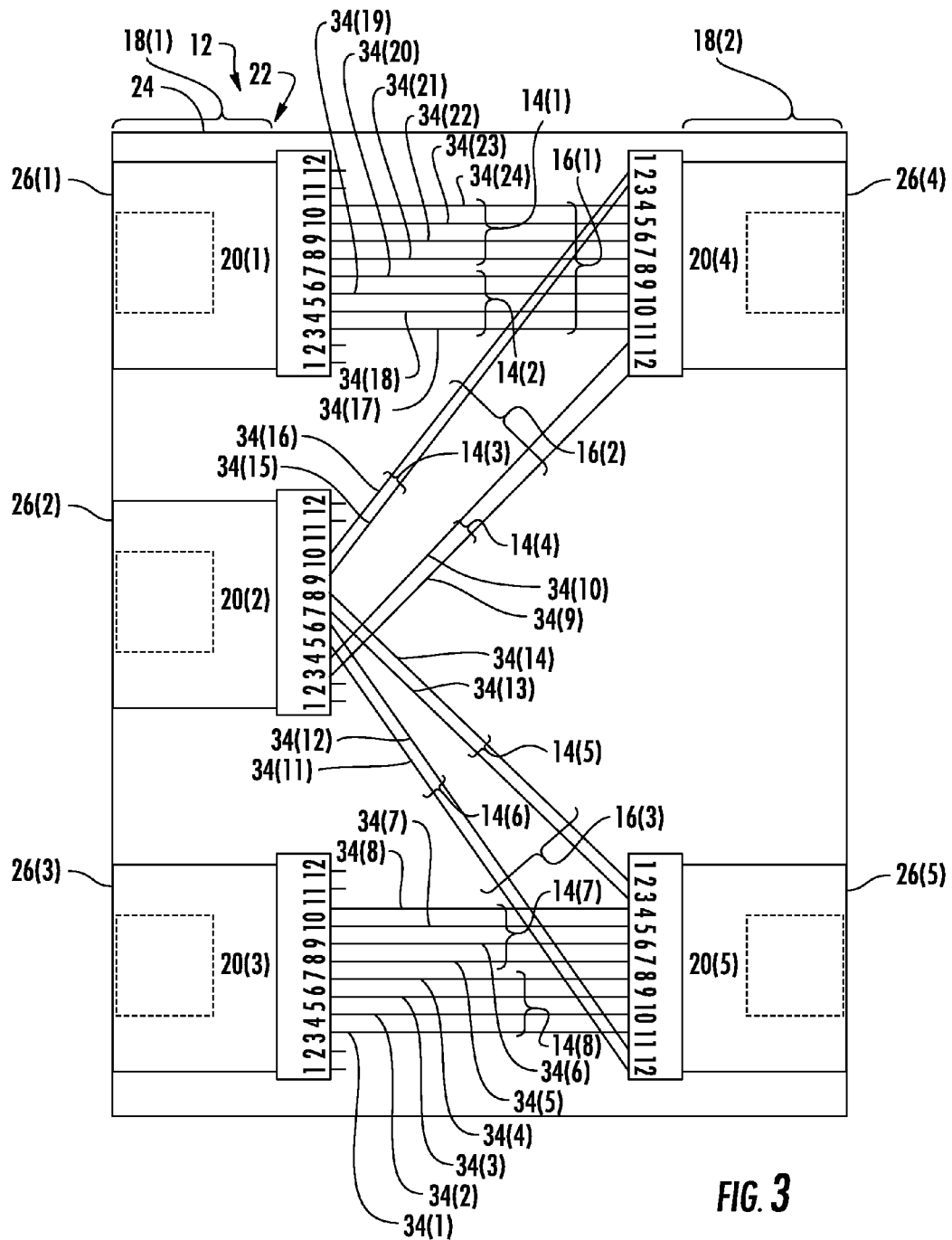
FIG. 3 is a detailed schematic representation of the fiber optic connection assembly of FIG. 1 illustrating the individual optical fiber connections of the fiber optic connection assembly disposed within a module housing.

As discussed above, one advantage of the fiber optic network 10 is that multiple BASE-8 configurations can be shuffled and combined into a smaller number of twelve (12) fiber configurations. In this regard, FIG. 3 is a detailed schematic of fiber optic assembly 12 showing the individual optical fiber connections within the fiber optic module 22. As discussed above, each of multi-fiber connectors 20(1) through 20(3) have a BASE-8 configuration. In particular, each multi-fiber connector 20 has an array of twelve (12) fiber positions, of which eight (8) are used for the BASE-8 configuration. Here, the standard BASE-8 configuration uses fiber positions three (3) through ten (10) of each of multi-fiber connectors 20(1) through 20(3). As shown by FIG. 3, a plurality of individual optical fibers 34(1) through 34(24) are connected between connector sets 18(1) and 18(2). In particular, optical fibers 34(1) through 34(8), corresponding to optical fiber groups 14(7) and 14(8), are connected between fiber positions three (3) through ten (10) of multi-fiber connector 20(3) and respective fiber positions ten (10) through three (3) of multi-fiber connector 20(5). Likewise, optical fibers 34(17) through 34(24) of optical fiber groups 14(1) and 14(2) are connected between fiber positions three (3) through ten (10) of multi-fiber connector 20(1) and respective fiber positions ten (10) through three (3) of multi-fiber connector 20(4).

For the remaining fiber positions of multi-fiber connectors 20(4) and 20(5), optical fibers 34(15) and 34(16) of optical fiber group 14(3) are connected between fiber positions nine (9) and ten (10) of multi-fiber connector 20(2) and respective fiber positions two (2) and one (1) of multi-fiber connector 20(4), while optical fibers 34(9) and 34(10) of optical fiber group 14(4) are connected between fiber positions three (3) and four (4) of multi-fiber connector 20(2) and fiber positions twelve (12) and eleven (11) of multi-fiber connector 20(4). Similarly, optical fibers 34(13) and 34(14) of optical fiber group 14(5) are connected between fiber positions seven (7) and eight (8) of multi-fiber connector 20(2) and fiber positions two (2) and one (1) of multi-fiber connector 20(5), while optical fibers 34(11) and 34(12) of optical fiber group 14(6) are connected between fiber positions five (5) and six (6) of multi-fiber connector 20(2) and multi-fiber connector 20(5).

Figure 4B:
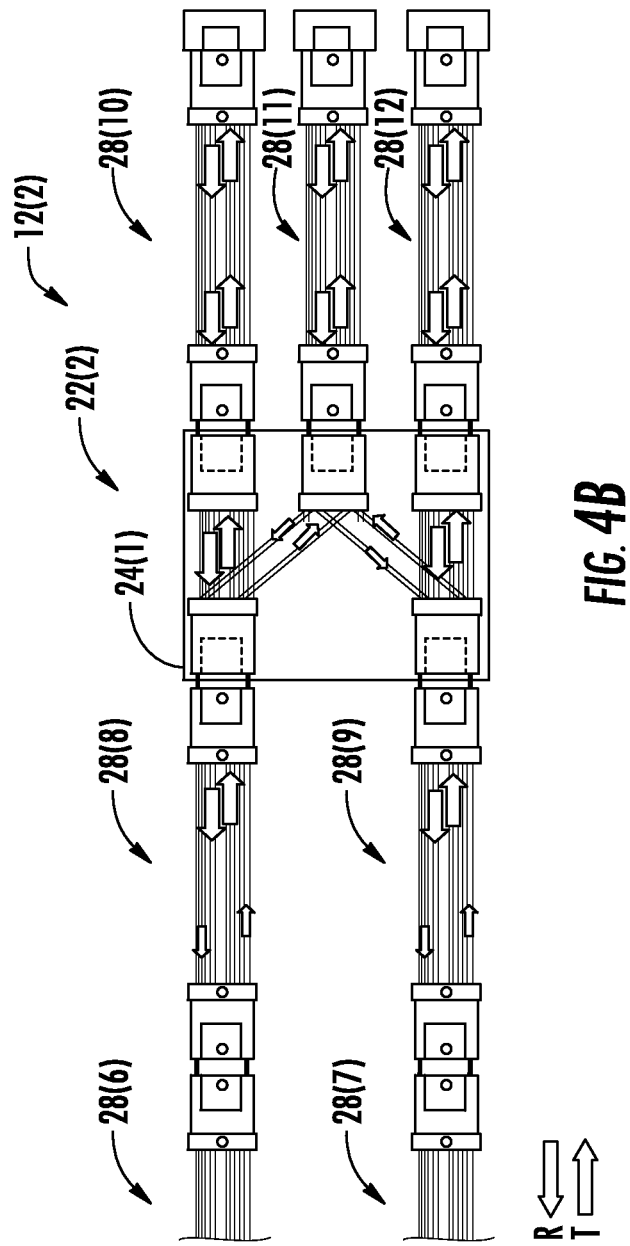

As discussed above with respect to FIG. 2, the benefits of the increased signal density in the fiber optic cable 28 of the network 10 increase as the number of fiber optic cables utilized in the network 10 increase. In this regard, another embodiment of a fiber optic network 36 is disclosed, having a pair of complementary fiber optic modules 22(1) and 22(2). Fiber optic module 22(1) is connected to a plurality of BASE-8 fiber optic equipment via fiber optic cables 28(1) through 28(3), and is connected to the complementary fiber optic module 22(2) via fiber optic cables 28(4) through 28(9). In this embodiment, because of the increased physical distance between fiber optic modules 22(1) and 22(2), the fiber optic modules 22 must be interconnected by two (2) sets of three (3) fiber optic cables 28, with each set connected in series. As shown by FIGS. 4A and 4B, fiber optic cables 28(4), 28(7), and 28(9) are connected in series, and fiber optic cable 28(5), 28(6), and 28(8) are also connected in series. By utilizing all twelve (12) fibers of these fiber optic cables 28(4) through 28(9), the cable density is increased between the fiber optic modules 22(1) and 22 (2), and the cable volume is likewise reduced. It can also been seen that in the absence of fiber optic modules 22(1) and 22(2), an additional three (3) fiber optic cables connected in series would be required for BASE-8 fiber optic cable 28(2) to be connected to BASE-8 fiber optic cable 28(11).

It should be understood that, in this and other disclosed embodiments, the connectors 30 of individual fiber optic cables 28 are connected to connectors 20 of the fiber optic modules 22 and to each other in a "key-up/key-down" ("KU/KD") configuration. In other words, the connectors 20, 30 are connected such that each fiber position of one connector is optically connected to the opposite fiber position of the other connector, e.g. 1-to-12, 2-to-11, etc. It should also be understood that these connectors 20, 30 may also be connected in a "key-up/key-up" ("KU/KU") configuration, as known in the art. In a KU/KU configuration, each fiber position of one connector is optically connected to the same fiber position of the other connector, e.g. 1-to-1, 2-to-2, etc.

Figure 5:
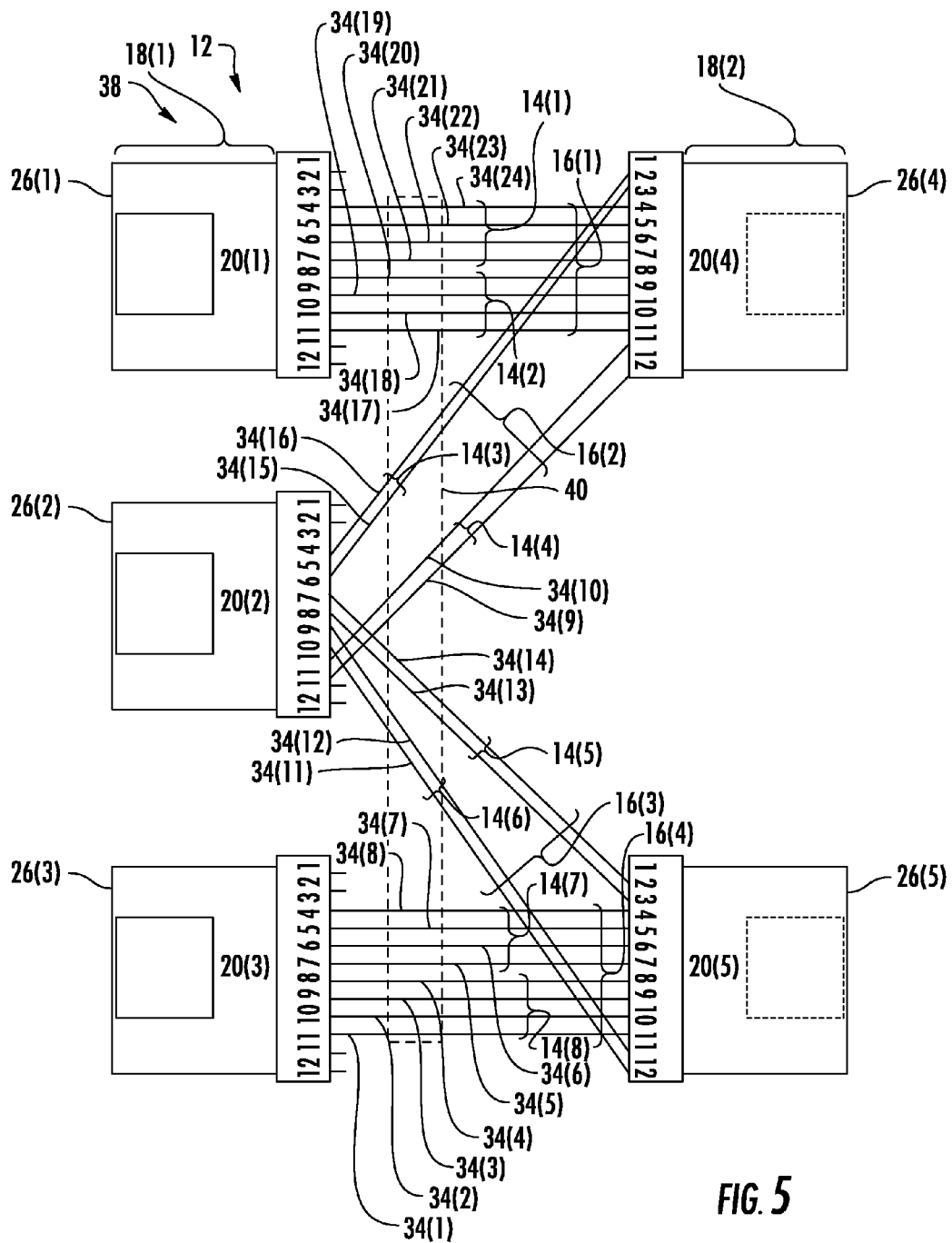
FIG. 5 is a schematic representation of an alternative fiber optic connection assembly comprising a furcation defining a fiber optic harness.

It should be understood as well that the fiber optic assembly 12 may have other configurations, such as a harness, that may have advantages over a module in certain applications. In this regard, FIG. 5 illustrates an exemplary fiber optic harness 38 having a BASE-8 to twelve (12) fiber configuration similar to the module of FIG. 3. Rather than enclosing the multi-fiber connectors 20(1) through 20(5) in an enclosure, the fiber optic harness 38 includes one or more furcations 40 which bundle and secure the individual optical fibers 34 while permitting the individual multi-fiber connectors 20(1) through 20(5) to be manipulated individually. This arrangement has particular advantages where space is at a premium and the fiber optic cables and fiber optic harness 38 must be routed through a small or convoluted physical volume.

In this embodiment, another difference between the fiber optic harness 38 and the fiber optic module 22 of FIG. 3 is that the polarity of multi-fiber connectors 20(1) through 20(3) are reversed with respect to the similar connectors of the fiber optic module 22 of FIG. 3. For example, in this embodiment, data transmission pair 16(1) extends between fiber positions three (3) through ten (10) of the multi-fiber connector 20(1) and respective fiber positions three (3) through ten (10) of the multi-fiber connector 20(4). Likewise, data transmission pair 16(4) extends between fiber positions three (3) through ten (10) of the multi-fiber connector 20(3) and respective fiber positions three (3) through ten (10) of the multi-fiber connector 20(5). In this embodiment also, optical fiber group 14(3) extends between fiber positions nine (9) and ten (10) of the multi-fiber connector 20(3) and respective fiber positions one (1) and two (2) of multi-fiber connector 20(4), while optical fiber group 14(4) extends between fiber positions nine (9) and ten (10) of the multi-fiber connector 20(2) and respective fiber positions eleven (11) and twelve (12) of the multi-fiber connector 20(4). Similarly, optical fiber group 14(5) extends between fiber positions five (5) and six (6) of the multi-fiber connector 20(2) and respective fiber positions one (1) and two (2) of the multi-fiber connector 20(5) and optical fiber group 14(6) extends between fiber positions seven (7) and eight (8) of the multi-fiber connector 20(2) and respective fiber positions eleven (11) and twelve (12) of the multi-fiber connector 20(5).

Figure 6:
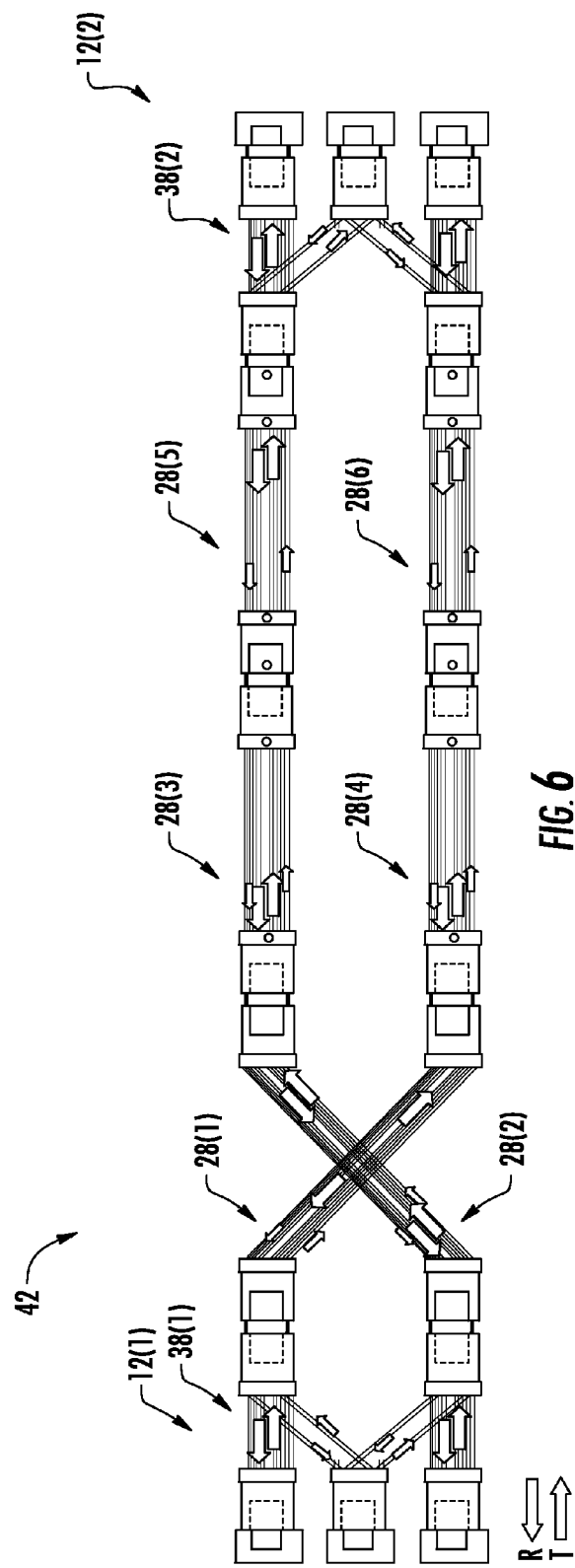
FIG. 6 is a schematic representation of another fiber optic network utilizing two fiber optic connection assemblies according to FIG. 5 and multiple fiber optic extension cables disposed therebetween.

Similar to the fiber optic network 36 of FIGS. 4A and 4B, a plurality of fiber optic harnesses 38 may be used instead of or in conjunction with one or more fiber optic modules. In this regard, FIG. 6 illustrates an alternative fiber optic network 42 having a pair of fiber optic harnesses 38(1) and 38(2) interconnected by two (2) pairs of three (3) fiber optic cables 28(1) through 28(6). One advantage of this arrangement, as discussed in detail above, is that the three (3) BASE-8 configurations of fiber optic harness 38(1) may be connected to the complementary BASE-8 configurations of fiber optic harness 38(2) using a fewer number of total fiber optic cables 28 therebetween.

Figure 7:
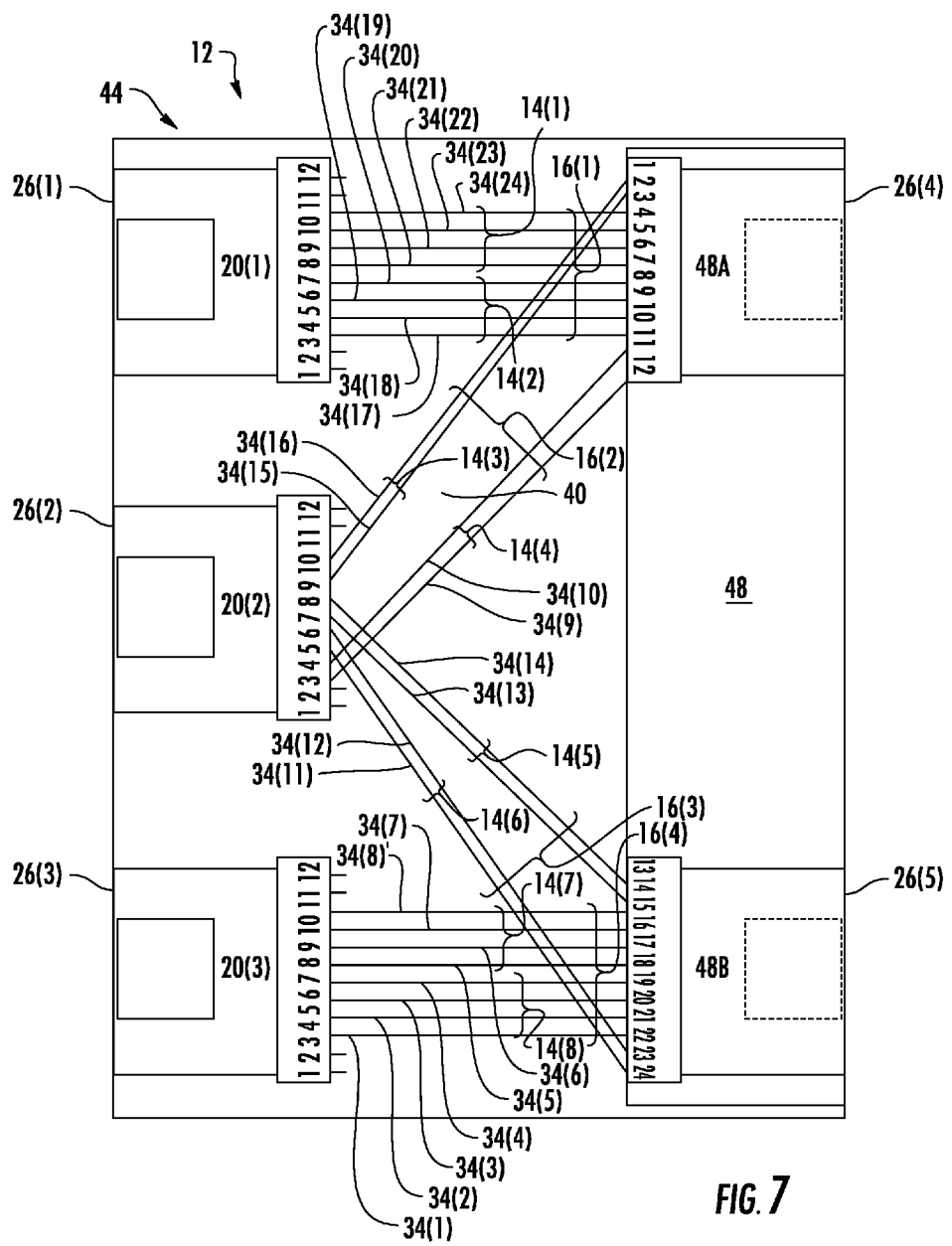
FIG. 7 is a detailed schematic representation of an alternative fiber optic connection assembly utilizing a twenty-four (24) fiber multi-fiber connector, illustrating the individual optical fiber connections of the fiber optic connection assembly disposed within a module housing.

In some embodiments, increased cable volume savings may be realized by employing higher density cables, for example, fiber optic cables terminated with individual connectors that can accommodate twenty-four (24) individual fibers. In this regard, FIG. 7 illustrates an alternative fiber optic assembly 44 that converts between three (3) BASE-8 port configurations and a single twenty-four (24) fiber configuration in a self-contained module 46. As shown by FIG. 7, each of the three (3) multi-fiber connectors 20(1) through 20(3) are connected to fiber positions one (1) through twenty-four (24) of multi-fiber connector 48. For ease of illustration, in this figure, individual rows 48A and 48B of respective fiber positions one (1) through twelve (12) and thirteen (13) through twenty-four (24) are separately illustrated. In practice, however, a typical twenty-four (24) fiber connector 48 may include the fiber positions as a pair of stacked arrays, or other compact form factor.

Figure 8:
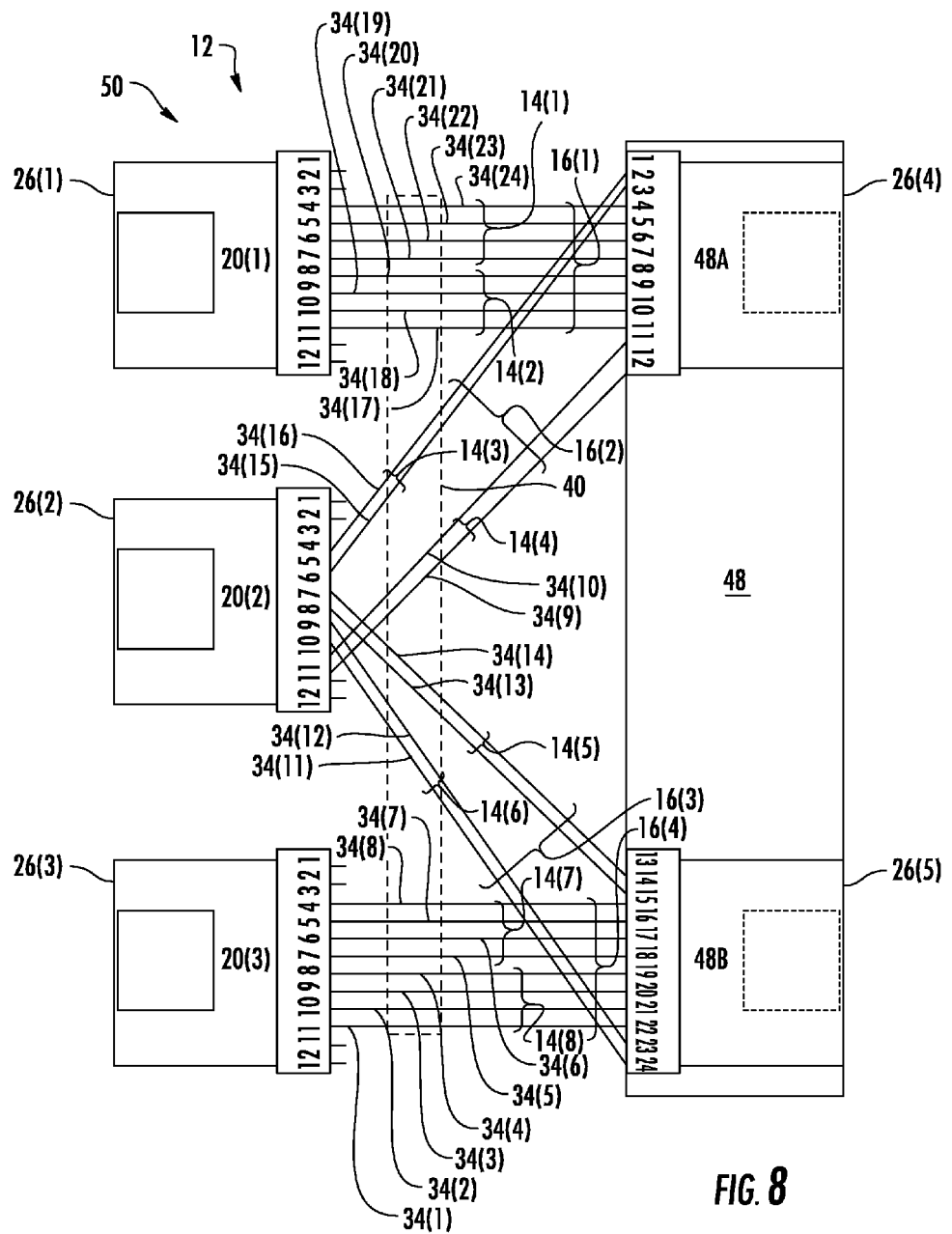
FIG. 8 is a schematic representation of an alternative fiber optic connection assembly utilizing a twenty-four (24) fiber multi-fiber connector comprising a furcation defining a fiber optic harness.

This arrangement may be employed as a harness as well. In this regard, FIG. 8 illustrates an exemplary harness 50 that converts between three BASE-8 multi-fiber connectors 20(1) through 20(3) and a single, twenty-four (24) fiber multi-fiber connector 48, in an arrangement similar to the module 46 of FIG. 7.

Figure 9:
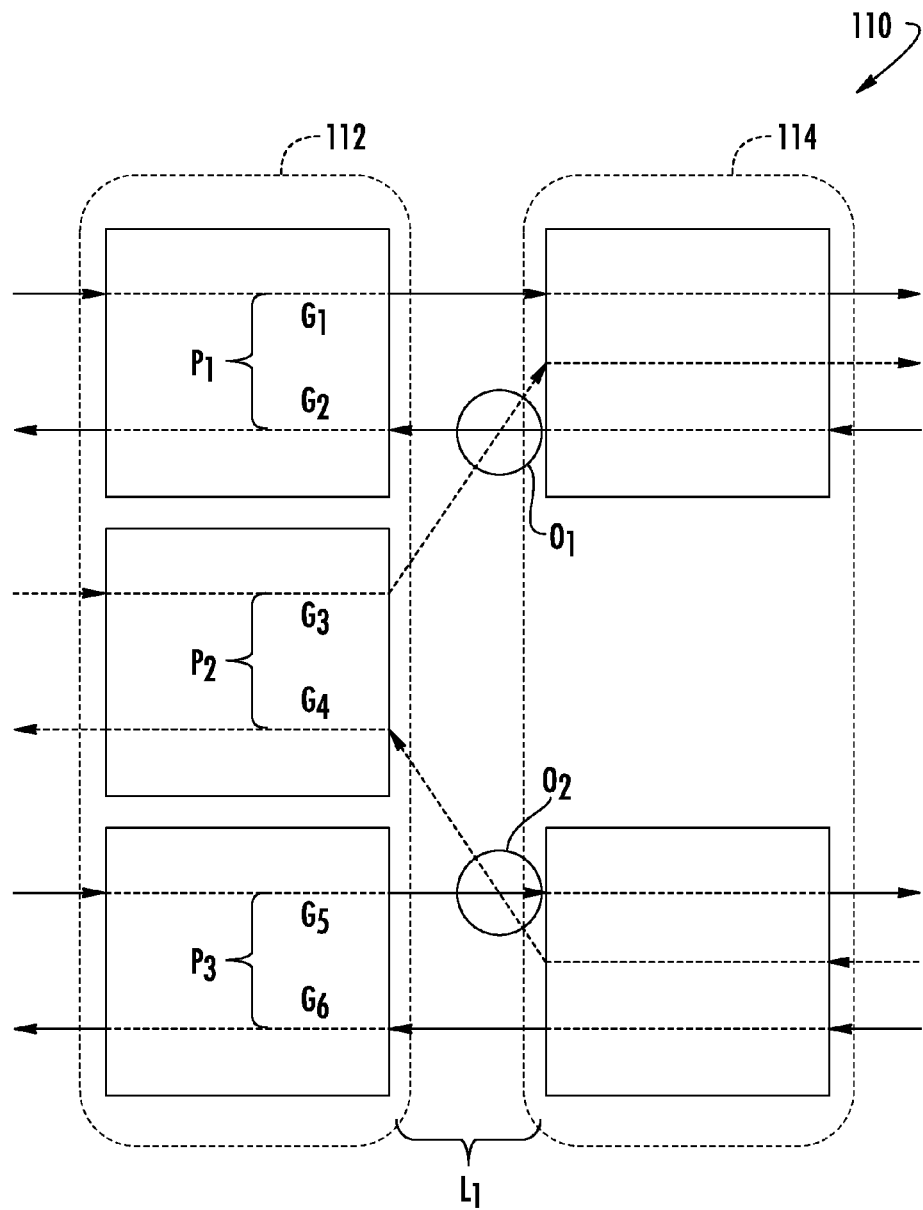
FIG. 9 illustrates a connection scheme for a fiber optic harness assembly according to an exemplary embodiment.
Figure 10:
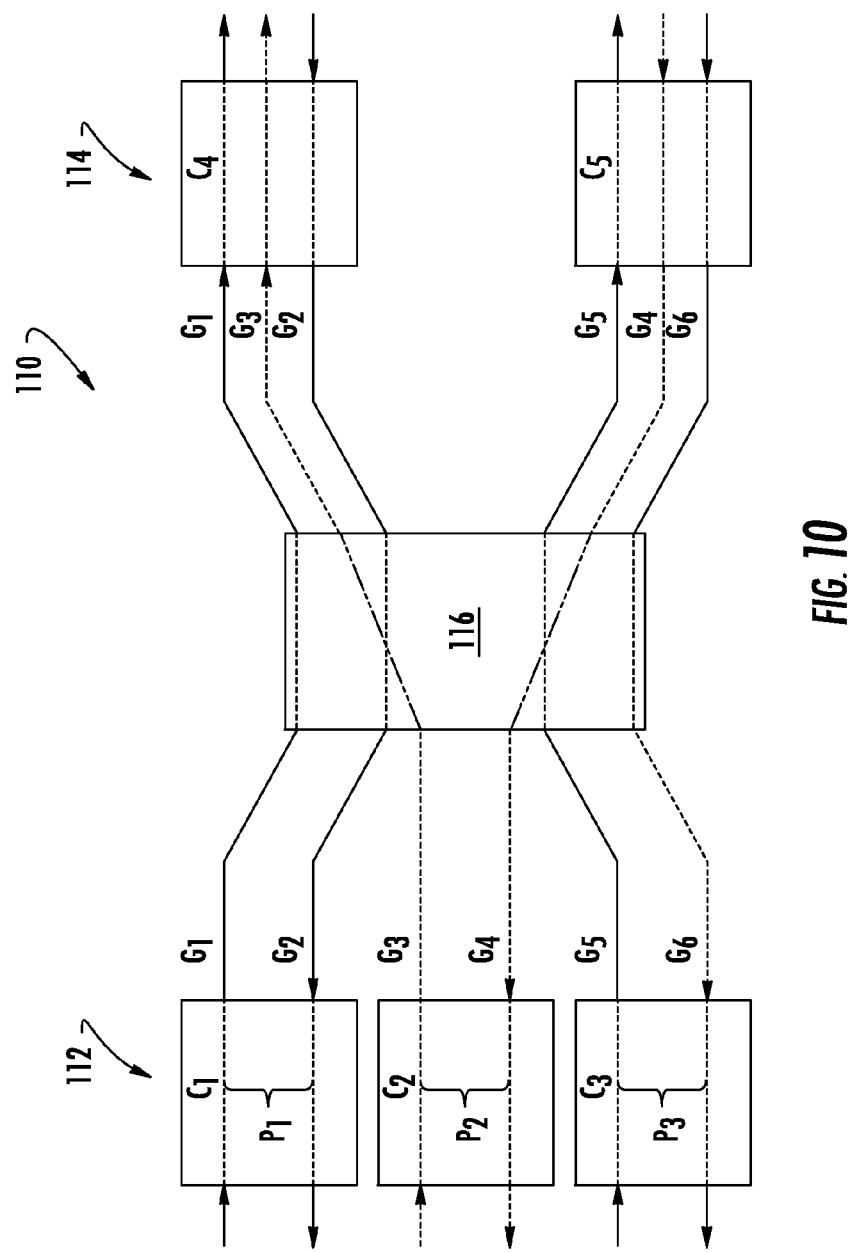
FIG. 10 is the connection scheme of FIG. 9 including a furcation.

Referring now to FIGS. 9 and 10, a fiber optic harness assembly 110 includes first, second, third, fourth, fifth, and sixth groups of optical fibers G1, G2, G3, G4, G5, G6, a first connector set 112, and a second connector set 114. The groups of optical fibers G1, G2, G3, G4, G5, G6 are arranged in data transmission pairs of the groups such that one group of each pair is configured to transmit data and the other group of the pair is configured to receive data (symbolized in FIGS. 9 and 10 by arrows according to an embodiment). The groups of each pair may be configured to both transmit and/or receive data. According to an exemplary embodiment, the pairs of the groups are organized such that a first pair P1 includes the first and second groups G1, G2 of optical fibers, a second pair P2 includes the third and fourth groups G3, G4 of optical fibers, and a third pair P3 includes the fifth and sixth groups G5, G6 of optical fibers.

According to an exemplary embodiment, the first connector set 112 includes first, second, and third connectors C1, C2, C3 (see FIG. 10; e.g., interfaces, adapters, multi-fiber connectors), and the second connector set 114 includes fourth and fifth connectors C4, C5. In some embodiments, the optical fibers of each group G1, G2, G3, G4, G5, G6 are the same length as the other optical fibers of the respective group G1, G2, G3, G4, G5, G6 (e.g., less than 1% difference in length relative to the longest fiber). Configuring the optical fibers of a particular group to be the same length as one another is intended to reduce skew in data transmission via parallel-optics processes.

According to an exemplary embodiment, the first pair P1 of groups of optical fibers extends between the first and fourth connectors C1, C4 such that the optical fibers of the first and second groups G1, G2 of optical fibers are the same length as one another (e.g., less than 1% difference in average length of the groups' fibers relative to the longer group's average length). The third pair P3 of groups of optical fibers extends between the third and fifth connectors C3, C5 such that the optical fibers of the fifth and sixth groups G5, G6 of optical fibers are the same length as one another. In some embodiments, the optical fibers of the groups G1, G2, G5, G6 of optical fibers of the first and third pairs P1, P3 are all the same length as one another, but need not always be so.

Figure 13:
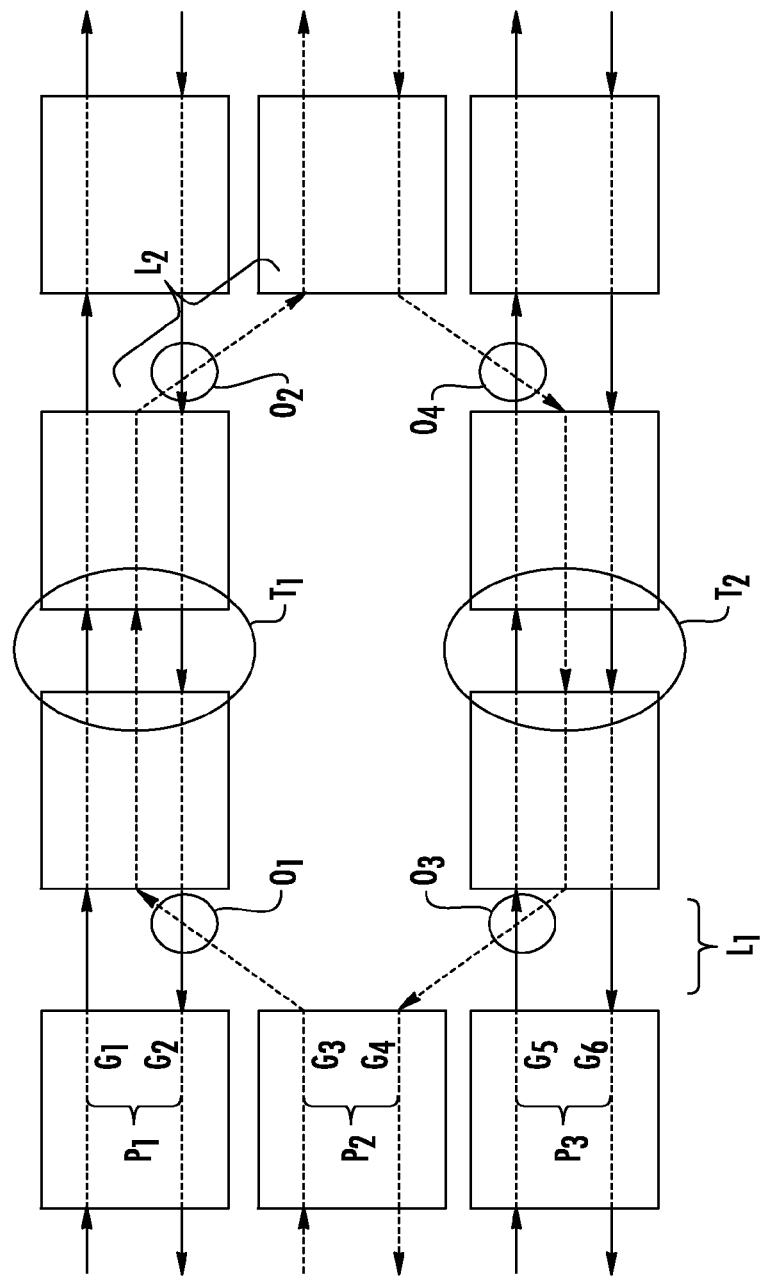
FIG. 13 is a polarity scheme, as may be used with quad small form-factor pluggable (QSFP) modules for parallel-optics data transmission, according to an example embodiment.

According to an exemplary embodiment, the third group G3 of optical fibers extends between the second and fourth connectors C2, C4 and the fourth group G4 of optical fibers extends between the second and fifth connectors C2, C5, where the optical fibers of the third and fourth groups G3, G4 of optical fibers are the same length as one another. In some embodiments, the optical fibers of the third and fourth groups G3, G4 of optical fibers are a different length (e.g., at least 1% difference in average length of the groups' fibers relative to the longer group's average length) than the optical fibers of the groups G1, G2, G5, G6 of optical fibers of the first and third pairs P1, P3 (see, e.g., L1 as shown in FIG. 9 and compare to L2 as shown in FIG. 13).

According to an exemplary embodiment, the first pair P1 of groups of optical fibers only extends between the first and fourth connectors C1, C4, and the third pair P3 of groups of optical fibers only extends between the third and fifth connectors C3, C5. Such an arrangement facilitates a direct route of communication between the respective connectors, thereby reducing the path length of optical fibers (and associated attenuation) and reducing the complexity of the scheme relative to more elaborate arrangements. In some embodiments, the optical fibers of the third group G3 only extend between the second and fourth connectors C2, C4, and the optical fibers of the fourth group G4 only extend between the second and fifth connectors C2, C5.

According to an exemplary embodiment, the groups G1, G2, G3, G4, G5, G6 of optical fibers only cross one another (e.g., over-pass) at two locations as shown in mappings of optical pathways between the first and second sets of connectors 112, 114. As shown in FIGS. 9 and 10 the corresponding crossings consist of a first crossing O1 between the second and third groups G2, G3 and a second crossing O2 between the fourth and fifth groups G4, G5 (see also crossings O3 and O4 as shown in FIG. 13). Such a scheme is intended to reduce the likelihood of manufacturing error due to incorrect interconnections. Other more-complicated arrangements are contemplated.

According to an exemplary embodiment, the first, second, third, fourth, fifth, and sixth groups of optical fibers G1, G2, G3, G4, G5, G6, each include at least two optical fibers per group, such as at least four, at least six, at least eight, at least twelve, at least twenty-four, at least one-hundred-and-forty-four, or more. In some embodiments, the first, second, third, fourth, fifth, and sixth groups of optical fibers G1, G2, G3, G4, G5, G6 each include the same number of optical fibers as one another, such as two per group, such as at least four, at least six, at least eight, at least twelve, at least twenty-four, at least one-hundred-and-forty-four per group, or more. The number of fibers in groups of the same pair may be the same. The number of fibers in groups of optical fibers in all of the groups G1, G2, G3, G4, G5, G6 may be the same, or may differ, such as four fibers in each of groups G1, G2, G5, G6 and eight fibers in each of groups G3, G4. The fibers of a group, of a pair, and/or of the harness assembly may operate in conjunction with one another to provide a finely parsed signal(s) and a correspondingly higher rate of data transmission, when compared to schemes using a fewer number of fibers per group (such as only one single mode fiber). In various alternate embodiments, the optical fibers of the groups may be arranged in different configurations, such as loose optical fibers (single mode or multi-mode), ribbons of optical fibers joined together, or even one or more "multi-core" fibers that include multiple optical fibers bound in a single cladding.

Figure 11:
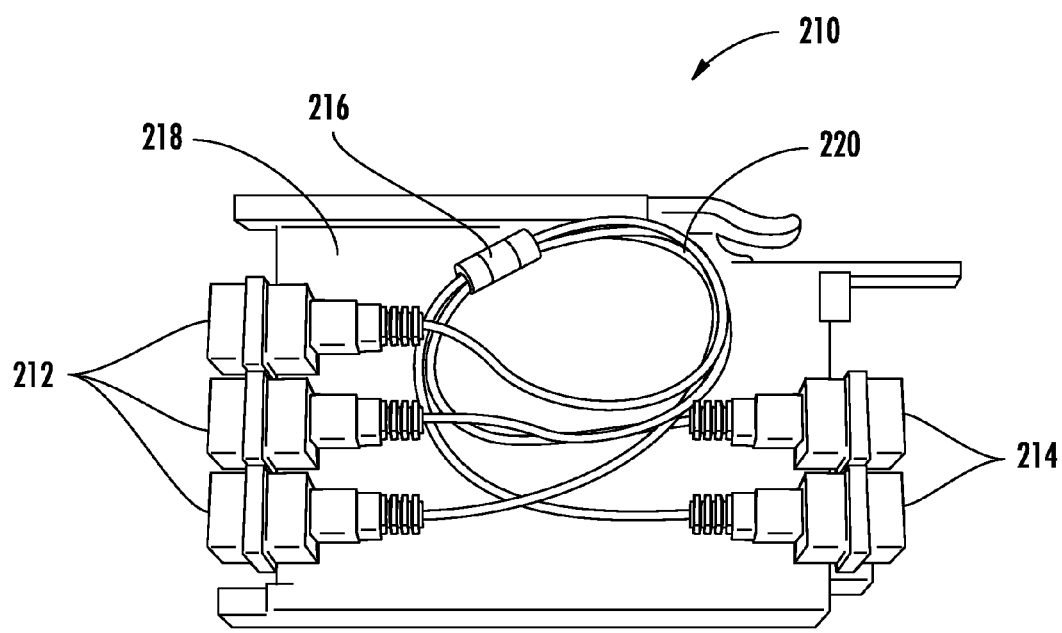
FIG. 11 is a digital image of a harness module according to an exemplary embodiment.
Figure 12:
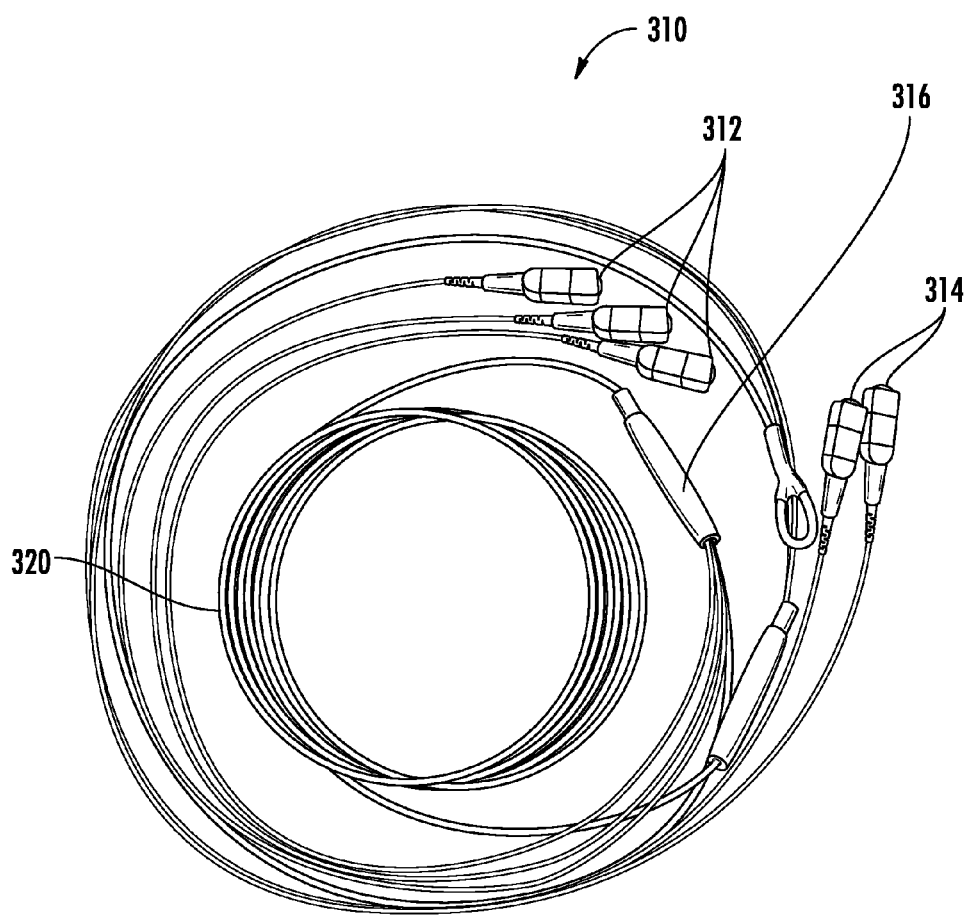
FIG. 12 is a digital image of a harness cable according to an exemplary embodiment.

Referring to FIGS. 10-12, the fiber optic harness assembly 110 may include a furcation 116', 216, 316 (e.g., partitioning element, separation structure) between the first and second sets of connectors 212/214, 312/314 through which passes each of the groups of optical fibers (see FIGS. 11 and 12). FIG. 11 shows the furcation 216 as part of a harness module 210, which also includes a housing 218 supporting fiber optic cables 220 and multi-fiber connectors 212, 214 arranged in a scheme similar to FIGS. 9 and 10 or the alternate embodiments disclosed. FIG. 12 shows the furcation 316 as part of a harness cable 310. As shown in FIGS. 11 and 12, there is a separate cable leg 220, 320 (e.g., jacket, sheath, furcation tube, leg) between the furcation 216, 316 and each of the connectors 212, 214 and 312, 314, and each of the groups of optical fibers passes through two of the cable leg 220, 320 between the first and second sets of connectors 212, 214 and 312, 314.

In FIG. 11, the connectors 212, 214 are constrained relative to one another by the housing 218, while in FIG. 12 the cable legs 320 are maneuverable and are at least 0.3 m in length, whereby any two of the connectors 312, 314 may be positioned relative to one another anywhere in a distance range between adjoining one another (i.e., touching) to at least 0.5 m apart from one another (i.e., about 0.6 m) (e.g., or at least about 1 m apart from one another where the length of the tubes is at least 0.5 m in length; or greater distances with greater tube lengths), which allows for great flexibility in the routing of data communications, such as between various components of computer hardware in a data center.

Referring to FIG. 11, Applicant has found that the maximum length of the harness cables 220 within the module 210 should be approximately twelve and a half inches (or the metric equivalent length), which has been found to allow enough slack for the cables 220 to be inside the module space (i.e., within the housing 218) without going under the connectors 212, 214. The minimum length of the harness cables 220 should be approximately nine and a half inches, which will allow for two reworks of the connectors 212, 214 at 38 mm length, as necessary, and still allows enough slack in the module 210 for low tension on the fibers in the cables 220.

Referring to FIG. 13, two harness assemblies (see also FIGS. 9 and 10), modules and/or cables as disclosed herein, may be used together as part of a polarity scheme and convey data via parallel optics transmission. The harnesses assemblies may be joined by trunk cables T1, T2, and may be configured according to a standard key-up/key-down configuration, as described in TIA 568C.0 standards (e.g., type A, type B, types A and/or B, type C) with regard to flipping polarity. The trunk cables T1, T2 may include any number of trunks or extender trunks, and may be routed through intermediate elements according to a more-elaborate scheme. As illustrated by the arrows shown in FIG. 13, for example, the trunk cables T1, T2 may support optical signals passing in both directions (e.g., both receiving and transmitting groups). This "two-way traffic" in each connector provides robustness to the system, where if one of the two trunk cables T1, T2 should fail, the other will still be able to pass signals for data communication, albeit at a slower speed.

Parallel optics for four-parallel-lane transmission (Tx) for land receivers (Rx) from 40 G (4×10 G) or 100 G (4×25 G) utilizing a twelve-fiber base multi-fiber connector MTP structure, as specified in IEEE (4×10), utilizes only 8-fibers out of the twelve-fiber MTP. However, embodiments disclosed herein enable customers to utilize all 12-fiber in backbone trunks, when six groups include four fibers each (see FIGS. 9 and 10). Additionally, the disclosed polarity schemes for QSFP devices (see FIG. 13) keep a logical flow of MTPs on one side to go to the nearest other MTP; the middle MTP is the only one that is split. In furcation during manufacturing, the process may be kept simple by utilizing two subunits and keeping most of the fibers grouped in the same tube. Only fibers from the middle MTP (e.g., pair P2 as shown in FIGS. 9 and 10) are diverted in groups. While other schemes may mix fibers from several groups, which increases risks of improper polarity. Furthermore, embodiments disclosed herein reduce skew because parallel signals are kept along same path with same length.

When converting to parallel optic systems, customers may face difficulty managing the placement of alignment pins in a fiber optic link, which are typically required for MTP/MPO connector mating, where one connector is pinned and the other pin-less. In addition, SR4 transmission requires 8-fibers for communication, however most current MPO cabling systems are 12-fiber or 24-fiber based, which results in less than 100% fiber utilization.

According to another aspect of technology disclosed herein, a user is able to use a single jumper to install at any location in a link and with any orientation regardless of system architectures by using a pin-less jumper (i.e., no pins on associated connectors) to plug into both the electronics and patch field. Some such embodiments include a pinned-to-pinned conversion module that allows a single pin-less jumper to be utilized in all system architectures while achieving 100% fiber utilization. According to an exemplary embodiment, the conversion could be any variation of the following configurations in addition to their multiples: (1) 24-fiber MPO to (3) 8-fiber MPO; (2) 12-fiber MPO to (3) 8-fiber MPO; (1) 24-fiber MPO to (2) 12-fiber MPO; (1) 48-fiber MTP to (6) 8-fiber MPO or (2) 24-fiber. In some embodiments, MTP jumpers are converted or replaced from a pinned-unpinned structure jumper, to a completely pin-less jumper structure. In addition, this same pin-less jumper may work in a direct-connect (from electronic port to electronic port) and in a cross-connect cabling scheme. By contrast, with contemporary systems such cabling schemes would require various wiring/pinning jumper schemes, but the present solution simplifies the options for a single jumper solution to "fit all." Combining such a structure with a pinned MTP connector inside a module (see, e.g., FIG. 11) allows all trunks and jumpers in the link to be of the same polarity and pinning Referring to FIG. 11, a conversion device could be in a Plug & Play™ closet connector housing (CCH) module footprint or a Pretium EDGE® module footprint, as manufactured by Corning Cable Systems LLP of Hickory, N.C., United States of America. Some embodiments include pinned MTP connectors inside the module with unpinned trunks/jumpers external to the module.

The construction and arrangements of the fiber optic harness assembly and polarity schemes, as shown in the various exemplary embodiments, are illustrative only. Although only a few embodiments have been described in detail in this disclosure, many modifications are possible (e.g., variations in sizes, dimensions, structures, shapes, and proportions of the various elements, values of parameters, mounting arrangements, use of materials, colors, orientations) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present invention.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

It will be apparent to those skilled in the art that various modifications and variations can be made without departing from the spirit or scope of the invention. Since modifications combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. A fiber optic connection assembly comprising:
   first, second, third, fourth, fifth, sixth, seventh, and eighth groups of optical fibers, wherein the groups of optical fibers are arranged in data transmission pairs of the groups whereby one group of each pair is configured to provide data in a transmit direction and the other group of the pair is configured to provide data in a receive direction, wherein the pairs of the groups are organized such that a first pair comprises the first and second groups of optical fibers, a second pair comprises the third and fourth groups of optical fibers, a third pair comprises the fifth and sixth groups of optical fibers, and a fourth pair comprises the seventh and eighth groups of optical fibers;
   a first connector set comprising first, second, and third connectors; and
   a second connector set comprising fourth and fifth connectors,
   wherein each of the first, second, third, fourth, and fifth connectors is a multi-fiber connector having a first parallel optical configuration comprising n fiber positions,
   wherein the first pair of groups of optical fibers extends between the first and fourth connectors,
   wherein the second pair of groups of optical fibers extends between the second and fourth connectors,
   wherein the third pair of groups of optical fibers extends between the second and fifth connectors,
   wherein the fourth pair of groups of optical fibers extends between the third and fifth connectors, and
   wherein the fifth and sixth groups of optical fibers are connected to the second connector at fiber positions located between the fiber positions of the third group of optical fibers and the fiber positions of the fourth group of optical fibers.

2. The fiber optic connection assembly of claim 1, further comprising at least one furcation configured to bundle one or more groups of optical fibers together, thereby defining a fiber optic harness.

3. The fiber optic connection assembly of claim 1, further comprising a module housing configured to retain the first and second connector sets, thereby defining a fiber optic module.

4. The fiber optic connection assembly of claim 1, wherein n is equal to twelve (12).

5. The fiber optic connection assembly of claim 4, wherein each of the first, second, seventh, and eighth groups of optical fibers has four (4) optical fibers; and each of the third, fourth, fifth, and sixth groups of optical fibers has two (2) optical fibers.

6. The fiber optic connection assembly of claim 5, wherein the first pair of groups of optical fibers extends between fiber positions three (3) through ten (10) of the first connector and respective fiber positions ten (10) through three (3) of the fourth connector; and
   wherein the fourth pair of groups of optical fibers extends between fiber positions three (3) through ten (10) of the third connector and respective fiber positions ten (10) through three (3) of the fifth connector.

7. The fiber optic connection assembly of claim 6, wherein the third group of optical fibers extends between fiber positions nine (9) and ten (10) of the second connector and respective fiber positions two (2) and one (1) of the fourth connector; and
   wherein the fourth group of optical fibers extends between fiber positions three (3) and four (4) of the second connector and respective fiber positions twelve (12) and eleven (11) of the fourth connector.

8. The fiber optic connection assembly of claim 7, wherein the fifth group of optical fibers extends between fiber positions seven (7) and eight (8) of the second connector and respective fiber positions two (2) and one (1) of the fifth connector; and
   wherein the sixth group of optical fibers extends between fiber positions five (5) and six (6) of the second connector and respective fiber positions twelve (12) and eleven (11) of the fifth connector.

9. The fiber optic connection assembly of claim 5, wherein the first pair of groups of optical fibers extends between fiber positions three (3) through ten (10) of the first connector and respective fiber positions three (3) through ten (10) of the fourth connector; and
   wherein the fourth pair of groups of optical fibers extends between fiber positions three (3) through ten (10) of the third connector and respective fiber positions three (3) through ten (10) of the fifth connector.

10. The fiber optic connection assembly of claim 9, wherein the third group of optical fibers extends between fiber positions three (3) and four (4) of the second connector and respective fiber positions one (1) and two (2) of the fourth connector; and
    wherein the fourth group of optical fibers extends between fiber positions nine (9) and ten (10) of the second connector and respective fiber positions eleven (11) and twelve (12) of the fourth connector.

11. The fiber optic connection assembly of claim 7, wherein the fifth group of optical fibers extends between fiber positions five (5) and six (6) of the second connector and respective fiber positions one (1) and two (2) of the fifth connector; and
    wherein the sixth group of optical fibers extends between fiber positions seven (7) and eight (8) of the second connector and respective fiber positions eleven (11) and twelve (12) of the fifth connector.

12. A fiber optic connection assembly comprising:
    first, second, third, fourth, fifth, sixth, seventh, and eighth groups of optical fibers, wherein the groups of optical fibers are arranged in data transmission pairs of the groups whereby one group of each pair is configured to provide data in a transmit direction and the other group of the pair is configured to provide data in a receive direction, wherein the pairs of the groups are organized such that a first pair comprises the first and second groups of optical fibers, a second pair comprises the third and fourth groups of optical fibers, a third pair comprises the fifth and sixth groups of optical fibers, and a fourth pair comprises the seventh and eighth groups of optical fibers;

a first connector set comprising first, second, and third connectors, wherein each of the first, second, and third connectors is a multi-fiber connector having a first parallel optical configuration comprising n fiber positions; and a second connector set comprising a fourth connector, wherein the fourth connector is a multi-fiber connector having a second parallel optical configuration comprising first and second pluralities of fiber positions, wherein the second parallel optical configuration has 2n fiber positions arranged in two rows of n fiber positions, wherein a first row comprises fiber positions one (1) through n/2 and a second row comprises fiber positions n/2+1 through n, wherein the fourth connector is a multi-fiber connector having a second parallel optical configuration comprising 2n fiber positions arranged in two rows of n fiber positions, wherein a first row comprises fiber positions one (1) through n/2 and a second row comprises fiber positions n/2+1 through n, wherein the first pair of groups of optical fibers extends between the first connector and the first plurality of fiber positions of the fourth connector, wherein the second pair of groups of optical fibers extends between the second connector and the first plurality of fiber positions of the fourth connector, wherein the third pair of groups of optical fibers extends between the second connector and the second plurality of fiber positions of the fourth connector, wherein the fourth pair of groups of optical fibers extends between the third connector and the second plurality of fiber positions of the fourth connector, and wherein the fifth and sixth groups of optical fibers are connected to the second connector at fiber positions located between the fiber positions of the third group of optical fibers, and the fiber positions of the fourth group of optical fibers.

13. The fiber optic connection assembly of claim 12, further comprising at least one furcation configured to bundle one or more groups of optical fibers together, thereby defining a fiber optic harness.

14. The fiber optic connection assembly of claim 12, further comprising a module housing configured to retain the first and second connector sets, thereby defining a fiber optic module.

15. The fiber optic connection assembly of claim 12, wherein n is equal to twelve (12).

16. The fiber optic connection assembly of claim 15, wherein each of the first, second, seventh, and eighth groups of optical fibers has four (4) optical fibers; and each of the third, fourth, fifth, and sixth groups of optical fibers has two (2) optical fibers.

17. The fiber optic connection assembly of claim 16, wherein the first pair of groups of optical fibers extends between fiber positions three (3) through ten (10) of the first connector and respective fiber positions ten (10) through three (3) of the fourth connector;

wherein the fourth pair of groups of optical fibers extends between fiber positions three (3) through ten (10) of the third connector and respective fiber positions twenty-two (22) through fifteen (15) of the fourth connector;

wherein the third group of optical fibers extends between fiber positions nine (9) and ten (10) of the second connector and respective fiber positions two (2) and one (1) of the fourth connector;

wherein the fourth group of optical fibers extends between fiber positions three (3) and four (4) of the second connector and respective fiber positions twelve (12) and eleven (11) of the fourth connector;

wherein the fifth group of optical fibers extends between fiber positions seven (7) and eight (8) of the second connector and respective fiber positions fourteen (14) and thirteen (13) of the fourth connector; and wherein the sixth group of optical fibers extends between fiber positions five (5) and six (6) of the second connector and respective fiber positions twenty-four (24) and twenty-three (23) of the fourth connector.

18. The fiber optic connection assembly of claim 16, wherein the first pair of groups of optical fibers extends between fiber positions three (3) through ten (10) of the first connector and respective fiber positions three (3) through ten (10) of the fourth connector;

wherein the fourth pair of groups of optical fibers extends between fiber positions three (3) through ten (10) of the third connector and respective fiber positions fifteen (15) through twenty-two (22) of the fourth connector;

wherein the third group of optical fibers extends between fiber positions three (3) and four (4) of the second connector and respective fiber positions one (1) and two (2) of the fourth connector;

wherein the fourth group of optical fibers extends between fiber positions nine (9) and ten (10) of the second connector and respective fiber positions eleven (11) and twelve (12) of the fourth connector;

wherein the fifth group of optical fibers extends between fiber positions five (5) and six (6) of the second connector and respective fiber positions thirteen (13) and fourteen (14) of the fourth connector, and wherein the sixth group of optical fibers extends between fiber positions seven (7) and eight (8) of the second connector and respective fiber positions twenty-three (23) and twenty-four (24) of the fourth connector.

* * * * *